United States Patent
Stitt et al.

(10) Patent No.: US 11,253,103 B2
(45) Date of Patent: Feb. 22, 2022

(54) PORTABLE OUTDOOR COOKER

(71) Applicants: Daryl Stitt, Sears, MI (US); Terry Salisbury, Paris, MI (US)

(72) Inventors: Daryl Stitt, Sears, MI (US); Terry Salisbury, Paris, MI (US)

(*) Notice: Subject to any disclaimer, the term of this patent is extended or adjusted under 35 U.S.C. 154(b) by 0 days.

(21) Appl. No.: 16/662,057

(22) Filed: Oct. 24, 2019

(65) Prior Publication Data

US 2021/0121016 A1 Apr. 29, 2021

(51) Int. Cl.
*A47J 37/07* (2006.01)

(52) U.S. Cl.
CPC ....... *A47J 37/0763* (2013.01); *A47J 37/0704* (2013.01); *A47J 2037/0777* (2013.01)

(58) Field of Classification Search
CPC ............... A47J 37/0763; A47J 37/0704; A47J 2037/0777
See application file for complete search history.

(56) References Cited

U.S. PATENT DOCUMENTS

| | | |
|---|---|---|
| 81,039 A | 8/1868 | Vedder |
| 124,347 A | 3/1872 | Ferris |
| 129,049 A | 7/1872 | Oakley |
| 130,228 A | 8/1872 | Lovell |
| 148,970 A | 3/1874 | Moore |
| 264,627 A | 9/1882 | Clifford |
| 1,118,537 A | 11/1914 | Dodds |
| 1,171,859 A | 2/1916 | Leonard |
| 1,391,778 A | 9/1921 | Kessler, Jr. |
| 2,113,012 A | 4/1938 | Albrecht et al. |
| 2,787,260 A | 4/1957 | Williams |
| 2,922,414 A | 1/1960 | Brender |
| 3,561,348 A | 2/1971 | Weir, Jr. |
| 3,568,590 A * | 3/1971 | Grice ................ A47J 37/0704 99/446 |

(Continued)

FOREIGN PATENT DOCUMENTS

AT 517339 B1 1/2017

OTHER PUBLICATIONS

Stainless steel rocket stove accessory, grill tip grate and reducer, posted at etsy.com, © 2019 Etsy, Inc., [online], [site visited Oct. 29, 2019]. Available, from Internet, <URL: https://www.etsy.com/listing/687398959/stainless-steel-rocket-stove-accessory?ref=landingpage_similar_listing_top-5&frs=1>.

*Primary Examiner* — Alfred Basichas
(74) *Attorney, Agent, or Firm* — Inventech Patent Services, LLC; Marc A. Scharich

(57) ABSTRACT

A portable outdoor cooker may include a cooking chamber and a burn chamber each configured to be removably operably coupled to each other. The portable outdoor cooker may be configured to be selectively transitioned between a deployed use configuration in which the cooking chamber and the burn chamber are removably operably coupled to each other and a collapsed non-use configuration in which the cooking chamber and the burn chamber are decoupled from each other. When the portable outdoor cooker is in the collapsed non-use configuration, the cooking chamber is capable of receiving and housing the entire burn chamber therein such that, when the entire burn chamber is placed within the cooking chamber and a top hood of the cooking chamber is in a closed position, the entire burn chamber is capable of being stowed within the cooking chamber beneath the top hood.

20 Claims, 27 Drawing Sheets

(56) References Cited

U.S. PATENT DOCUMENTS

| | | | |
|---|---|---|---|
| 3,991,666 A | 11/1976 | Tidwell et al. | |
| 4,203,427 A | 5/1980 | Way, Jr. | |
| 4,664,026 A | 5/1987 | Milloy | |
| 4,721,037 A * | 1/1988 | Blosnich | A47J 37/0704 |
| | | | 126/25 R |
| 4,757,756 A | 7/1988 | Van Marr | |
| 4,788,906 A | 12/1988 | Starks | |
| 4,823,684 A | 4/1989 | Traeger et al. | |
| 5,031,602 A | 7/1991 | Vick | |
| 5,144,939 A | 9/1992 | Christopherson | |
| 5,203,316 A | 4/1993 | Pritchett | |
| 6,012,381 A | 1/2000 | Hawn | |
| 6,143,341 A | 11/2000 | Sikes | |
| 6,199,549 B1 | 3/2001 | Yerkes | |
| 6,557,545 B2 | 5/2003 | Williams | |
| 6,595,197 B1 | 7/2003 | Ganard | |
| 6,874,496 B2 * | 4/2005 | Waits | A23B 4/044 |
| | | | 126/1 D |
| 7,320,278 B2 | 1/2008 | Sikes | |
| 8,020,547 B2 | 9/2011 | Hepper et al. | |
| 8,726,896 B2 | 5/2014 | Guillory et al. | |
| 8,833,360 B2 | 9/2014 | Knight | |
| 8,915,238 B2 | 12/2014 | Goeken | |
| 9,380,910 B1 * | 7/2016 | Noel, II | A47J 37/0704 |
| 9,585,518 B1 | 3/2017 | Phillips | |
| 10,165,888 B2 | 1/2019 | Steputis | |
| 2005/0217659 A1 | 10/2005 | McClenahan | |
| 2007/0028914 A1 | 2/2007 | Galdamez | |
| 2008/0098906 A1 | 5/2008 | Davis | |
| 2011/0011387 A1 | 1/2011 | Sawaya | |
| 2014/0123972 A1 | 5/2014 | Prapas et al. | |
| 2014/0326233 A1 | 11/2014 | Traeger | |
| 2016/0363324 A1 | 12/2016 | Barry | |
| 2019/0049117 A1 * | 2/2019 | Tapaninaho | A21B 1/28 |

\* cited by examiner

PORTABLE OUTDOOR COOKER

TECHNICAL FIELD

The present disclosure relates generally to cooking devices and, more particularly, to a portable outdoor cooker.

BACKGROUND

Outdoor cookers are often used for cooking various types of food in a variety of commercial, residential and recreational outdoor environments (e.g. outdoors at businesses, homes, campgrounds, parks, marinas, stadium parking lots, etc.). Such outdoor cookers may generally include, for example, various outdoor grills, stoves, burners, smokers, campfire tripod cookers and the like.

While outdoor cookers typically provide users with at least the capability and flexibility to cook food outdoors (e.g. such as in the aforementioned variety of outdoor environments, etc.), as well as the capability to produce various cooking results (e.g. food having a variety of cooked textures, flavors, etc.), many outdoor cookers present various challenges and limitations to users before, during and after their use.

For example, many outdoor cookers, even some classified as "portable", are often inconvenient to handle, transport and store due to being relatively bulky and/or heavy. Additionally, many outdoor cookers are often inconvenient to set up and/or use, which may be time-consuming and frustrating to users. Furthermore, many outdoor cookers are designed to utilize electricity or burn relatively expensive fuels such as charcoal or gas (e.g. propane) to generate heat, which may not be readily available or plentiful at the time or location an outdoor cooker is to be used. Additionally, some outdoor cookers may not be fully capable of cooking food at various controlled temperatures so as to be capable of producing a wide range of desired cooking results.

With at least the aforementioned challenges and limitations in mind, there is a continuing unaddressed need for an outdoor cooker which is portable, which is relatively convenient to handle, transport, set up, use and store, which is capable of burning fuels which are typically readily available, plentiful and/or inexpensive, and which is capable of cooking various types of food at various controlled temperatures so as to be capable of producing a wide range of desired cooking results.

SUMMARY

At least the above-identified need is addressed with the present disclosure. One aspect of the present disclosure is directed to a portable outdoor cooker. The portable outdoor cooker may include a cooking chamber including one or more side walls, a bottom wall and a top hood including a lift handle operably coupled thereto. The top hood may be configured to be movable with respect to the one or more side walls and the bottom wall. Furthermore, the top hood may be further configured to be selectively moved between an open position and a closed position. Additionally, the portable outdoor cooker may further include a burn chamber including a main body having an upper portion and a lower portion. The lower portion of the main body has a lowermost surface of the main body. Furthermore, the burn chamber may further include a plurality of support legs which may be configured to be movable with respect to the main body. The plurality of support legs may be further configured to be selectively moved between (i) a supporting position in which the plurality of support legs are together capable of supporting the main body in an elevated position in which at least the lowermost surface of the main body is capable of being spaced above a ground surface disposed below the main body and (ii) a non-supporting position in which the plurality of support legs are not capable of supporting the main body in the elevated position. The cooking chamber and the burn chamber may each be configured to be removably operably coupled to each other. The portable outdoor cooker may be configured to be selectively transitioned between (i) a deployed use configuration in which the portable outdoor cooker is capable of at least cooking food and (ii) a collapsed non-use configuration in which the portable outdoor cooker is capable of at least being transported and/or stored. When the portable outdoor cooker is in the deployed use configuration: (i) each of the plurality of support legs of the burn chamber are in the supporting position, (ii) the cooking chamber and the burn chamber are removably operably coupled to each other, (iii) the burn chamber is capable of receiving and housing solid combustible fuel therein such that, when solid combustible fuel is placed within the burn chamber, the solid combustible fuel is capable of being burned within the burn chamber to provide heat to the cooking chamber, and (iv) the cooking chamber is capable of receiving and housing food therein such that, when food is placed within the cooking chamber, the food is capable of being cooked within the cooking chamber. Furthermore, when the portable outdoor cooker is in the collapsed non-use configuration: (i) the cooking chamber and the burn chamber are decoupled from each other, (ii) each of the plurality of support legs of the burn chamber are in the non-supporting position, and (iii) the cooking chamber is capable of receiving and housing the entire burn chamber therein such that, when the entire burn chamber is placed within the cooking chamber and the top hood of the cooking chamber is in the closed position, the entire burn chamber is capable of being stowed within the cooking chamber beneath the top hood.

Another aspect of the present disclosure is directed to a portable outdoor cooker. The portable outdoor cooker may include a cooking chamber including at least one side wall and a bottom wall connected to the at least one side wall. The bottom wall has an opening formed therein. Furthermore, the cooking chamber may further include a top hood including a lift handle operably coupled thereto. The top hood may be configured to be movable with respect to the at least one side wall and the bottom wall. Furthermore, the top hood may be further configured to be selectively moved between an open position and a closed position. With the top hood in the closed position, an interior space of the cooking chamber is defined therein between at least the at least one side wall, the bottom wall and the top hood. Additionally, the portable outdoor cooker may further include a burn chamber including a main body having a first end portion, a second end portion, an upper portion and a lower portion. The upper portion of the main body has an opening formed therein. The lower portion of the main body has a lowermost surface of the main body. Furthermore, the main body further has an interior space defined therein. Furthermore, the burn chamber may further include a plurality of support legs which may be configured to be movable with respect to the main body. The plurality of support legs may be further configured to be selectively moved between (i) a supporting position in which the plurality of support legs are together capable of supporting the main body in an elevated position in which at least the lowermost surface of the main body is capable of being spaced above a ground surface disposed below the main body and (ii) a non-supporting position in which the plurality of support legs are not capable of supporting the main body in the elevated position. Additionally, the portable outdoor cooker may further include a riser having an upper end portion and a lower end portion. The riser may be configured to be removably coupled to each of the cooking chamber and the burn chamber such that (i) the upper end portion of the riser may be configured to be removably coupled to the cooking chamber at the opening formed in the bottom wall of the cooking chamber and (ii) the lower end portion of the riser may be configured to be removably coupled to the burn chamber at the opening formed in the upper portion of the main body of the burn chamber. The portable outdoor cooker may be configured to be selectively transitioned between (i) a deployed use configuration in which the portable outdoor cooker is capable of at least cooking food and (ii) a collapsed non-use configuration in which the portable outdoor cooker is capable of at least being transported and/or stored.

BRIEF DESCRIPTION OF THE DRAWINGS

One or more exemplary embodiments of the present disclosure are pointed out with particularity in the appended claims. However, other features of the one or more embodiments will become more apparent and will be best understood by referring to the following detailed description in conjunction with the accompanying drawings, wherein:

DETAILED DESCRIPTION

Figure 1:
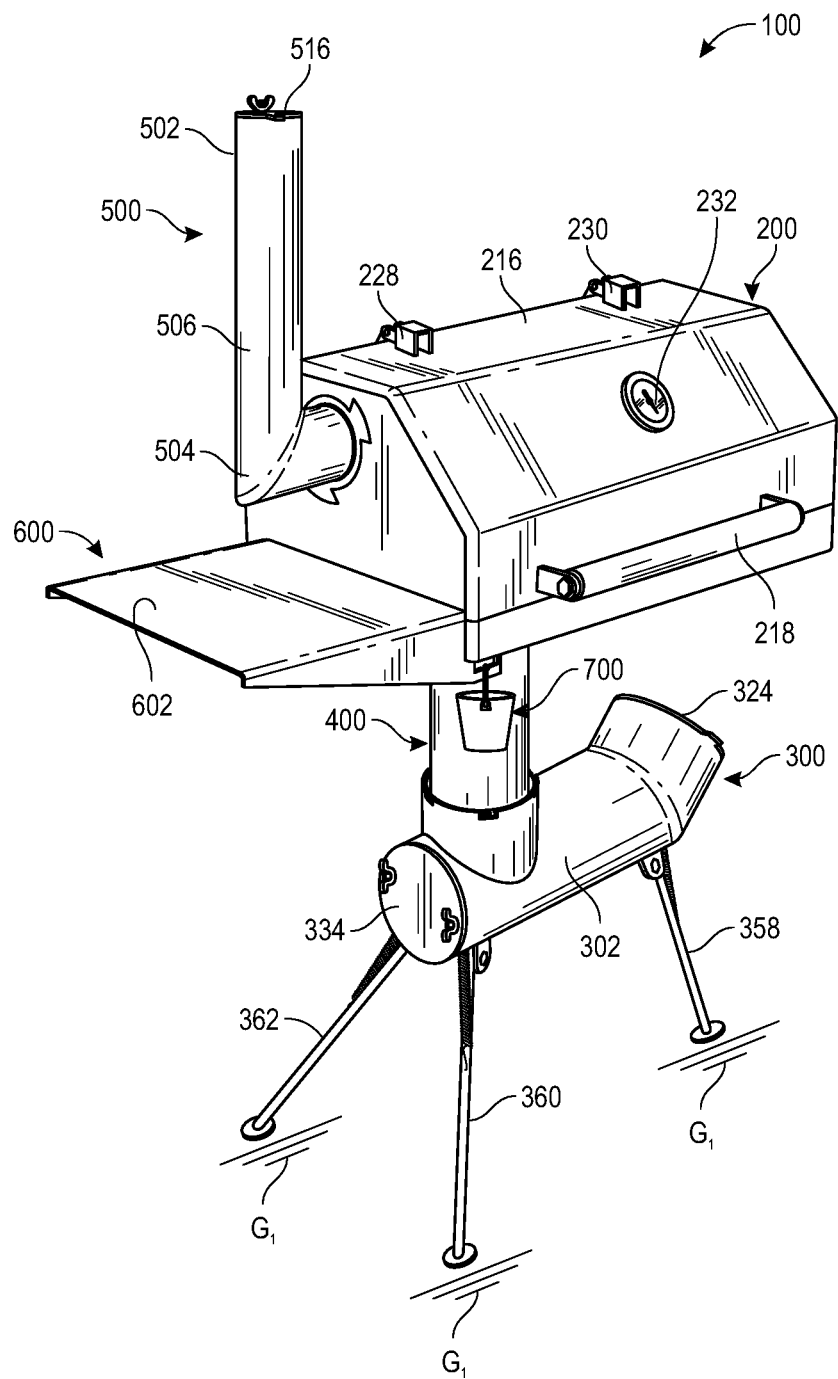
FIG. 1 is a perspective view of an exemplary portable outdoor cooker in a deployed use configuration.
Figure 2:
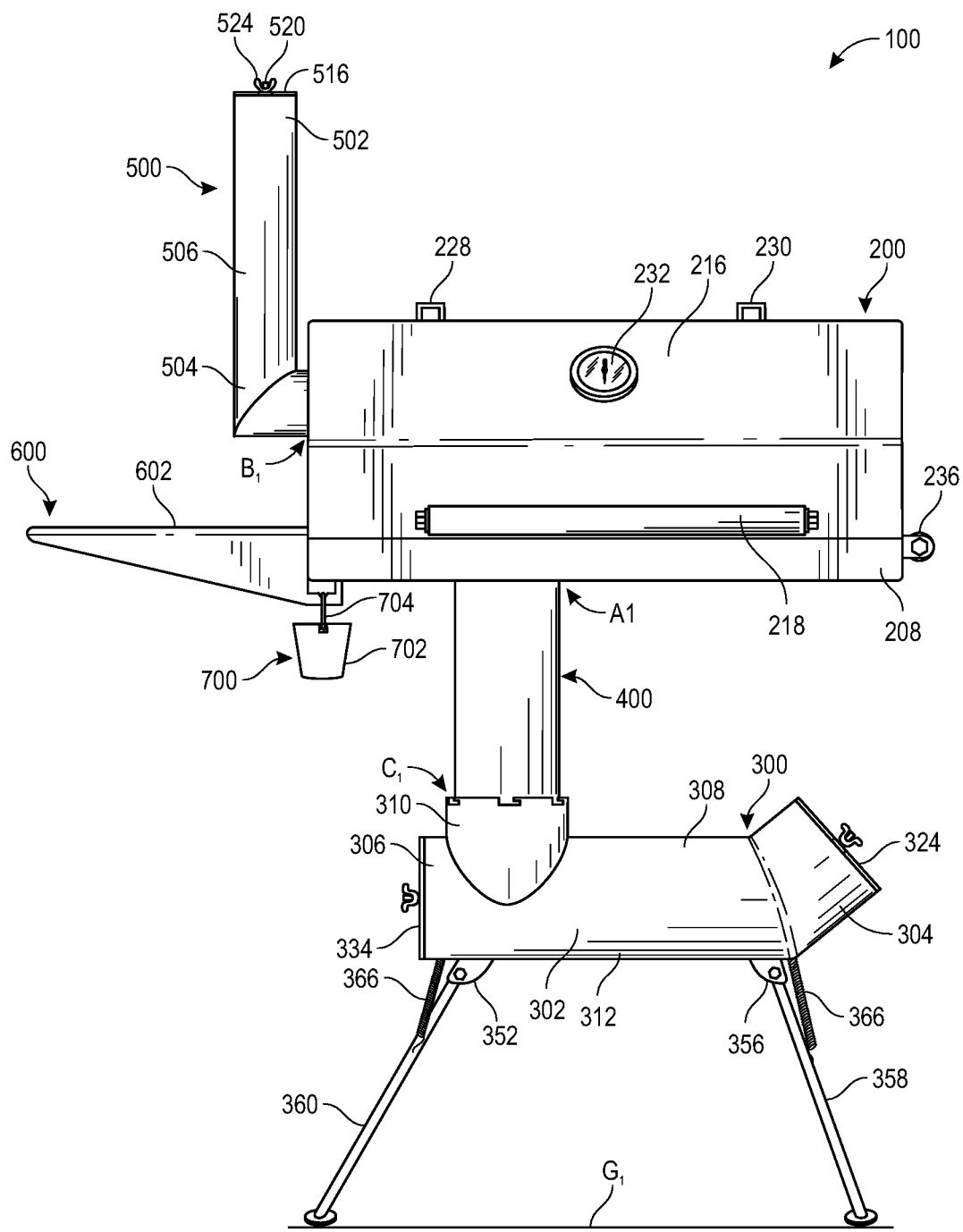
FIG. 2 is a front view of the portable outdoor cooker shown in FIG. 1.
Figure 3:
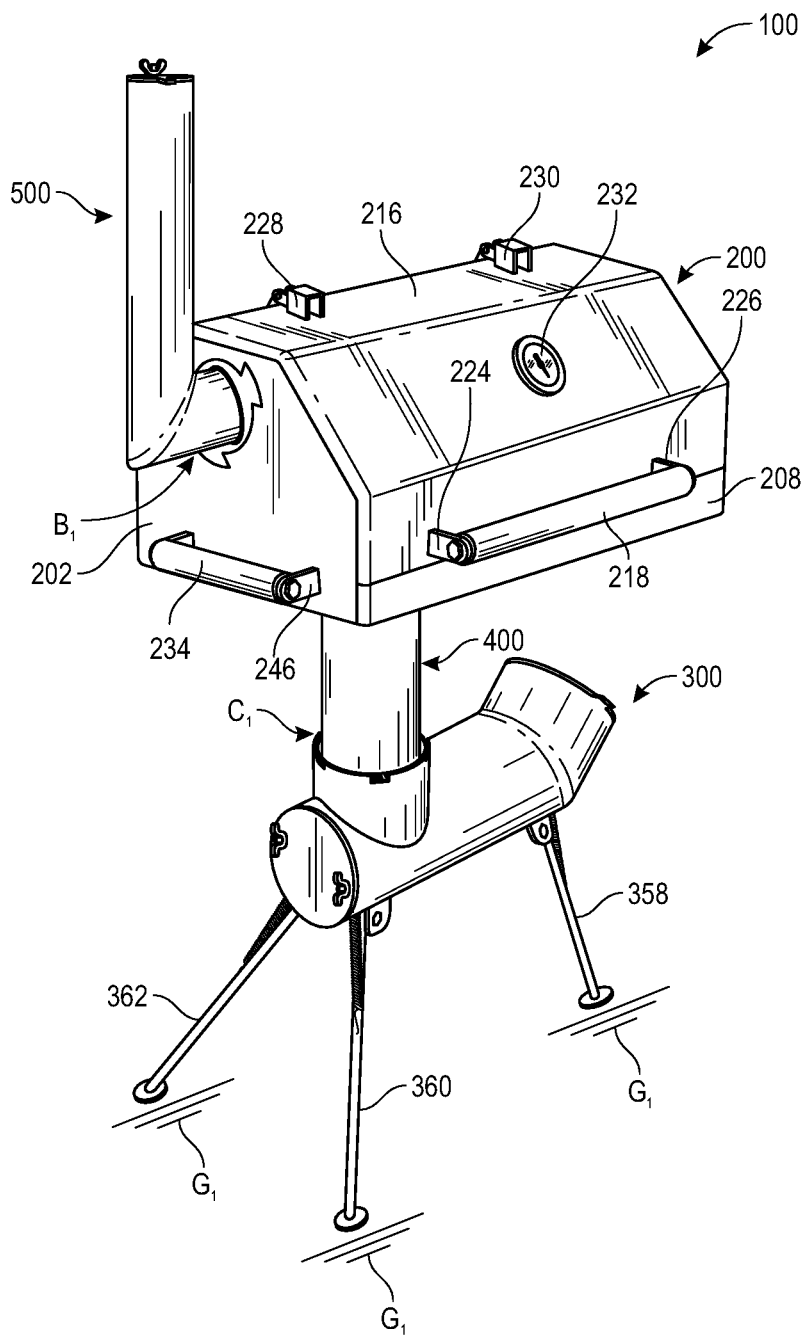
FIG. 3 is a perspective view of the portable outdoor cooker shown in FIGS. 1 and 2, in the deployed use configuration, with a shelf and a drip receptacle each removed from the portable outdoor to better illustrate a cooking chamber of the portable outdoor cooker.
Figure 4:
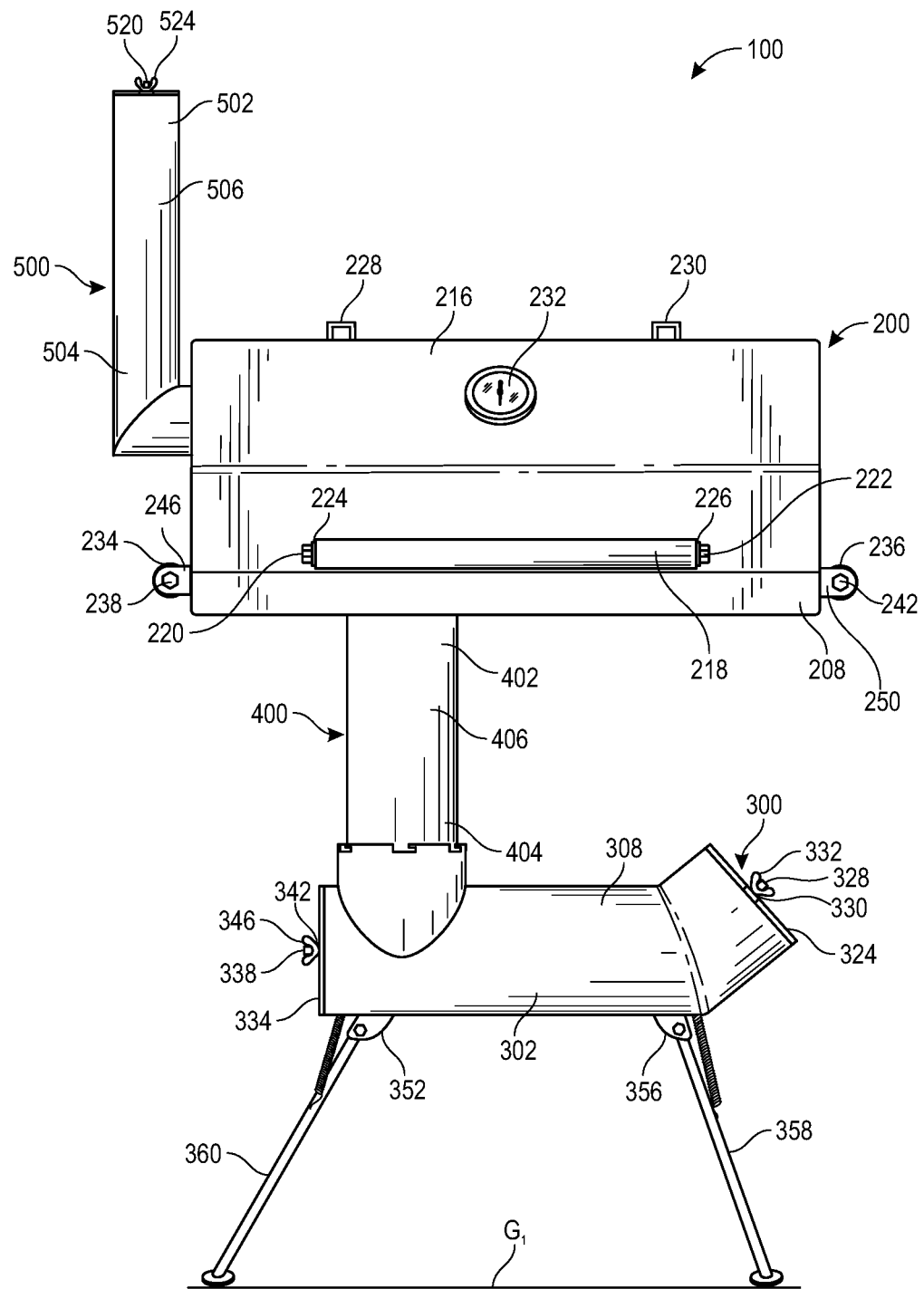
FIG. 4 is a front view of the portable outdoor cooker shown in FIG. 3.
Figure 5:
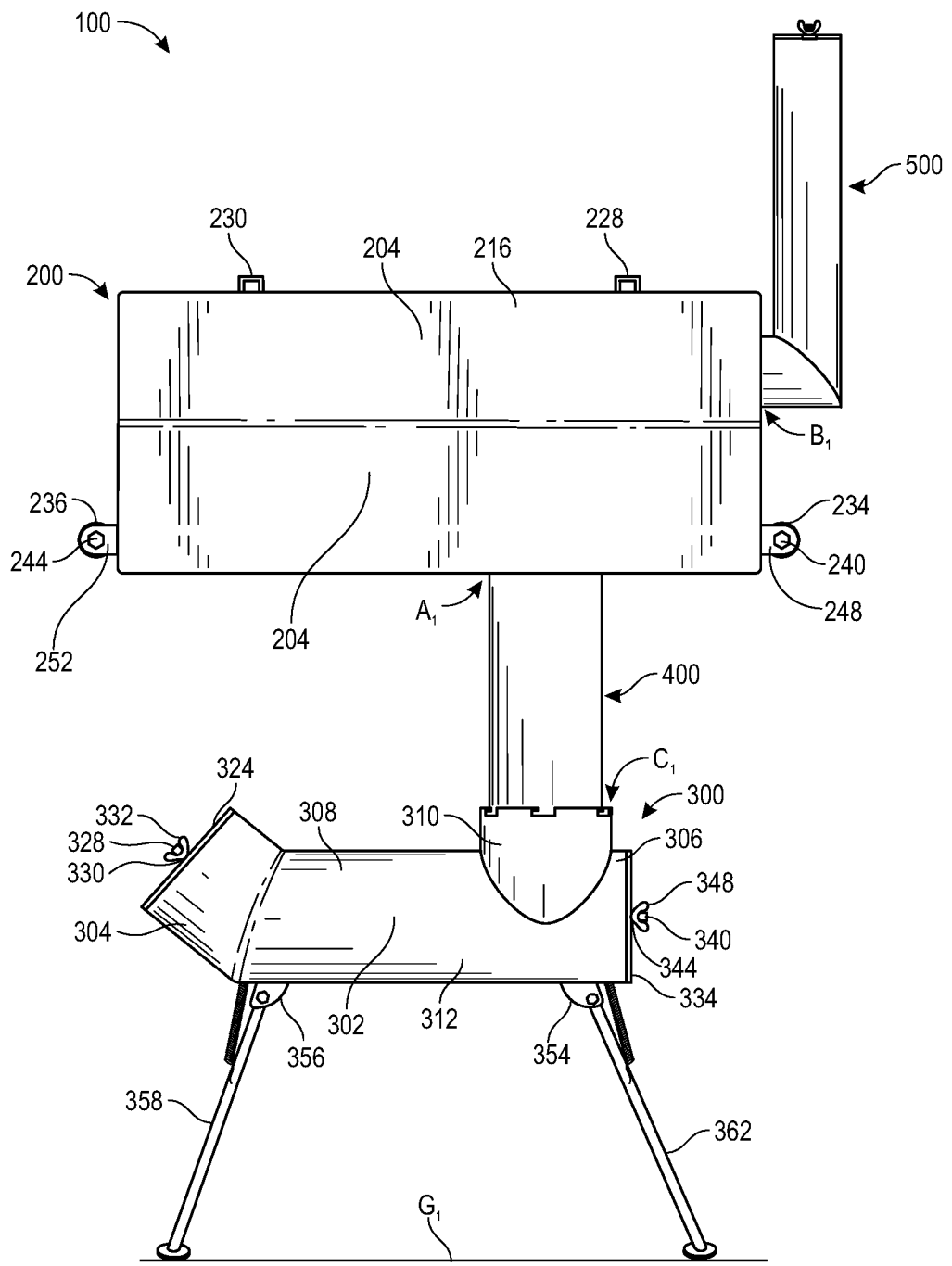
FIG. 5 is a rear view of the portable outdoor cooker shown in FIGS. 3 and 4.
Figure 6:
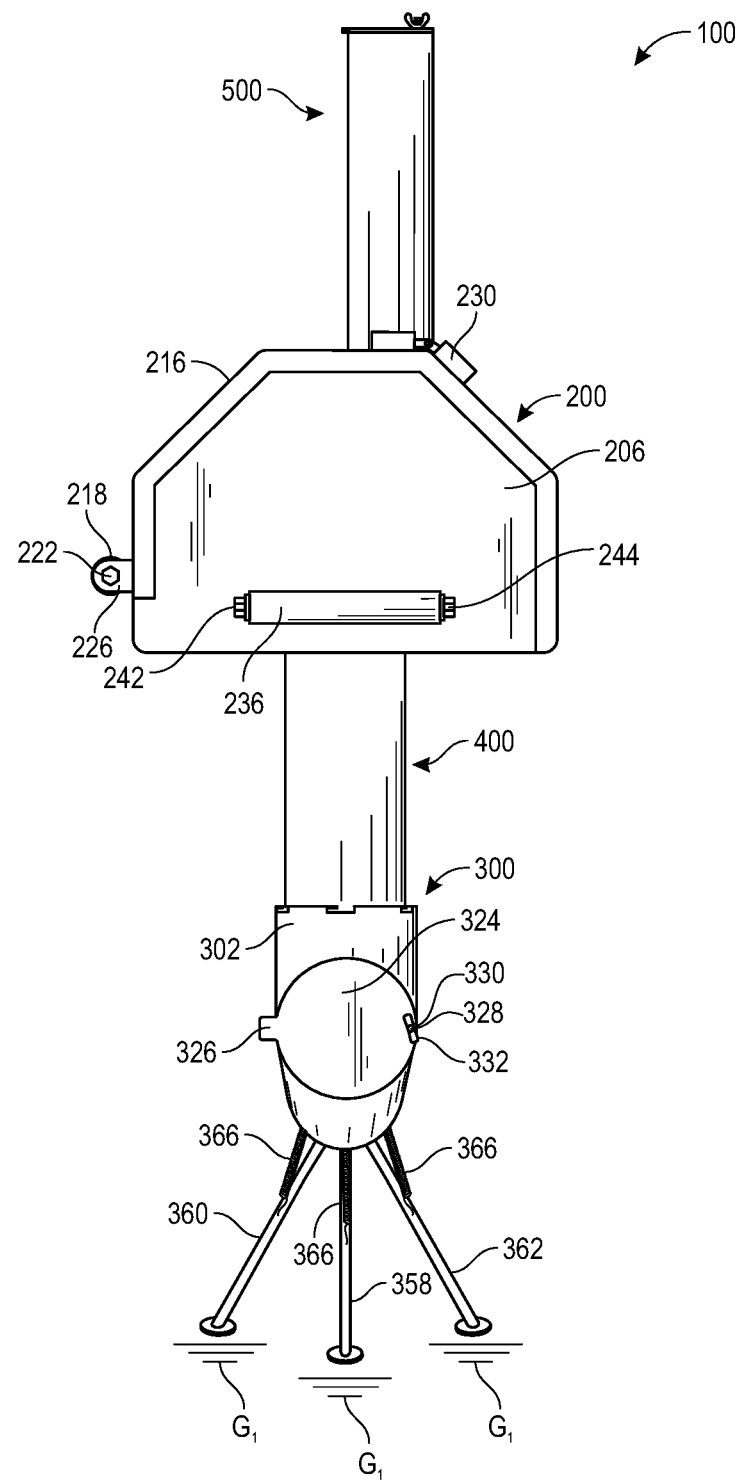
FIG. 6 is a first end view of the portable outdoor cooker shown in FIGS. 3-5.
Figure 7:
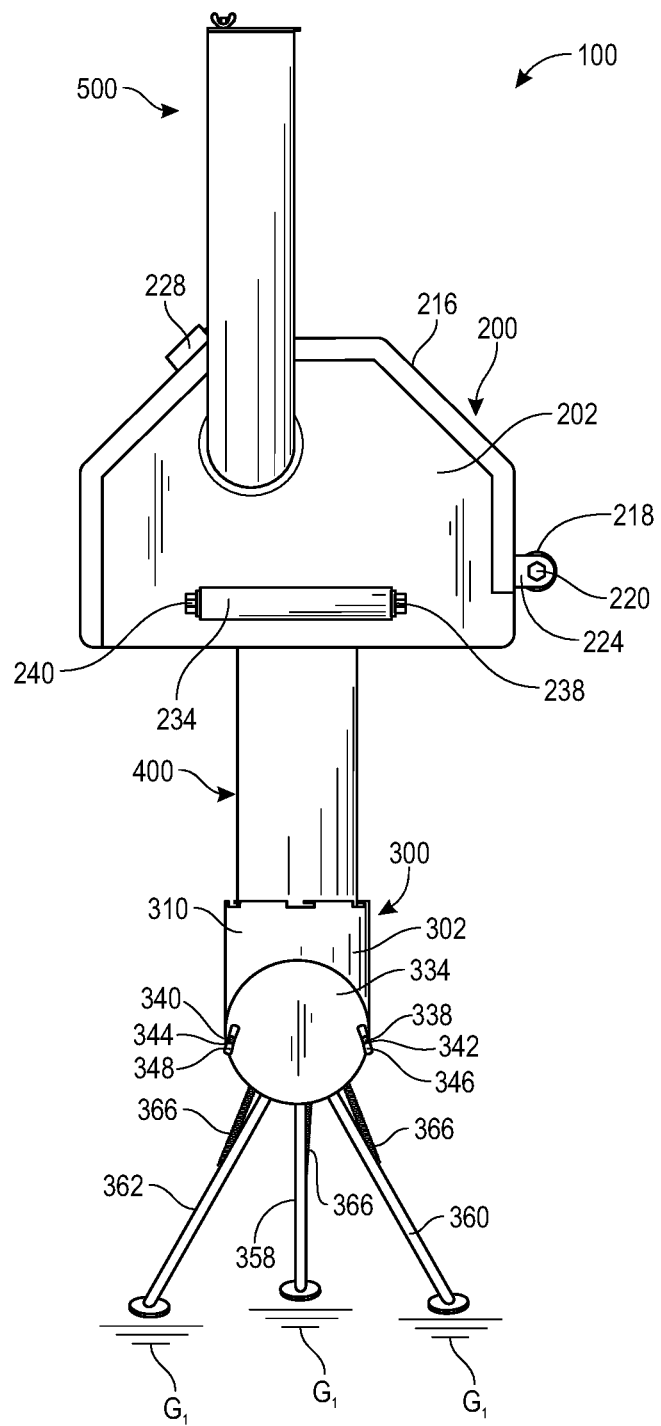
FIG. 7 is a second end view of the portable outdoor cooker shown in FIGS. 3-6.

As required, one or more detailed embodiments of the present disclosure are disclosed herein, however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure. Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art.

Referring generally to FIGS. 1-27, an exemplary portable outdoor cooker 100 according to the present disclosure is shown and described. As will be further described herein, the portable outdoor cooker 100 may be selectively transitioned between at least (i) a deployed use configuration (e.g. as shown in at least FIGS. 1-7 and 24) in which the portable outdoor cooker 100 is capable of at least cooking food and (ii) a collapsed non-use configuration (e.g. as shown in at least FIGS. 26 and 27) in which the portable outdoor cooker 100 is capable of at least being transported and/or stored. As will also be further described herein, the portable outdoor cooker 100 may generally include at least a cooking chamber 200, a burn chamber 300, a riser 400 which may be removably coupled to each of the cooking chamber 200 and the burn chamber 300 to removably operably couple the cooking chamber 200 and the burn chamber 300 to each other, a chimney 500 which may be removably coupled to the cooking chamber 200, a shelf 600 which may be removably coupled to the cooking chamber 200 and a drip receptacle 700 which may be removably coupled to the shelf 600.

Figure 26:
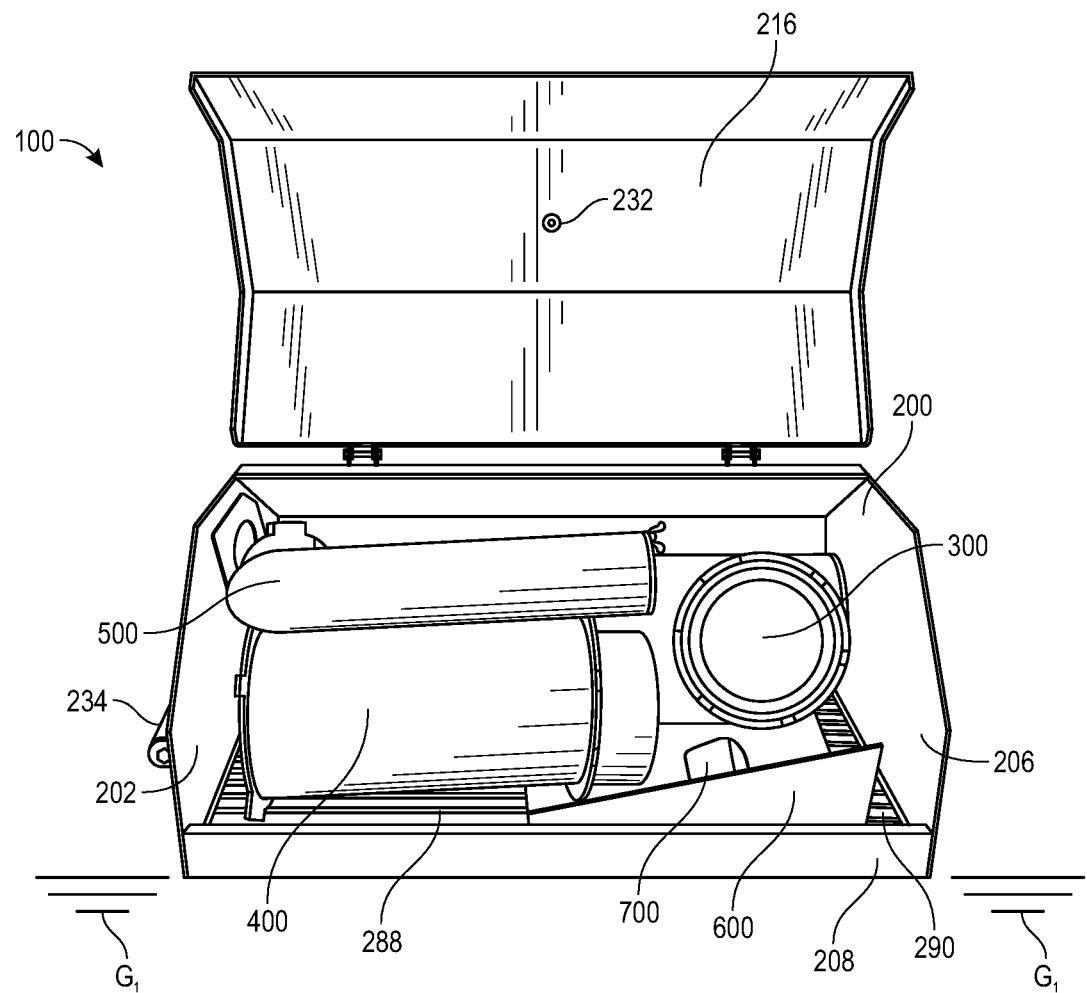
FIG. 26 is a front view of the portable outdoor cooker in a collapsed non-use configuration, which illustrates a top hood of the cooking chamber in an open position and various components of the portable outdoor cooker housed within the cooking chamber.
Figure 27:
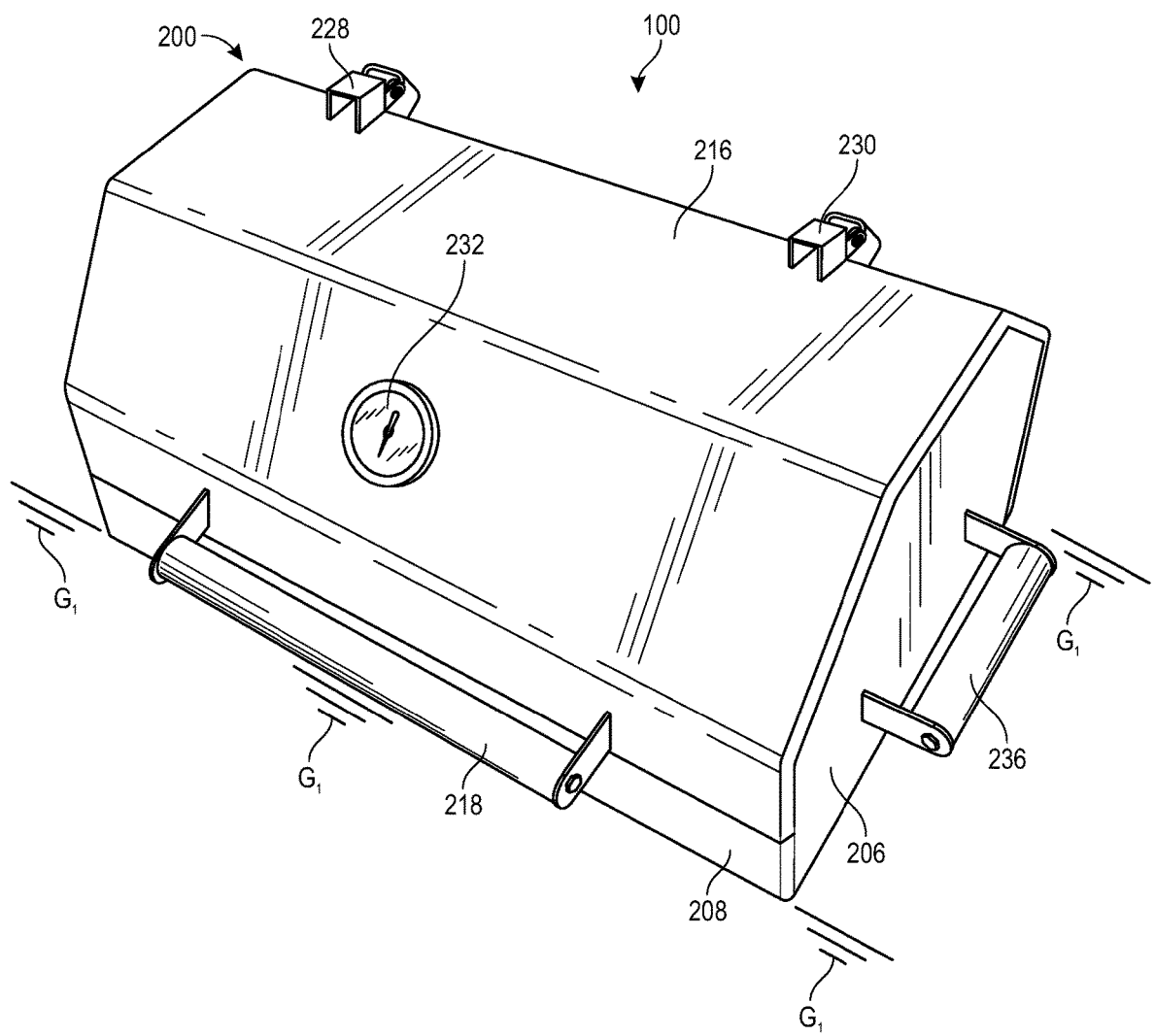
FIG. 27 is a perspective view of the portable outdoor cooker in the collapsed non-use configuration shown in FIG. 26, which further illustrates the top hood of the cooking chamber in a closed position and the various components of the portable outdoor cooker housed and stowed within the cooking chamber beneath the top hood.

Referring now to at least FIGS. 1-7, 12, 14, 15, 17-24, 26 and 27, the cooking chamber 200 of the portable outdoor cooker 100 is shown in several views. The cooking chamber 200 may include at least one side wall (i.e. one or more side walls). As a non-limiting example, the at least one side wall may include a plurality of side walls 202, 204, 206, 208. Alternatively, the at least one side wall may be in the form of a single, continuous side wall (e.g. a generally curved, circular or oval-shaped continuous side wall—not shown), as may be understood by one skilled in the art. As shown in FIG. 15, at least one side wall, such as side wall 202, may have an opening 210 formed therein, as will be further described herein. As shown in at least FIGS. 12 and 14, the cooking chamber 200 may further include a bottom wall 212 which may be connected to the plurality of side walls 202, 204, 206, 208. As non-limiting examples, the bottom wall 212 may be formed as an integral part or extension of at least some of the plurality of side walls 202, 204, 206, 208, or may be an entirely separate component which is connected to the plurality of side walls 202, 204, 206, 208, in any suitable permanent or temporary manner, as may be understood by one skilled in the art. Furthermore, the bottom wall 212 of the cooking chamber 200 may be a single, substantially flat bottom wall 212 having at least a substantially flat bottom surface extending substantially horizontally between at least the plurality of side walls 202, 204, 206, 208. In this manner, when the portable outdoor cooker 100 is in the collapsed non-use configuration, the cooking chamber 200 may remain advantageously stable when placed on a substantially flat surface (e.g. on a ground surface $G_1$ or other substantially flat surface when transported and/or stored, etc.—as shown in FIGS. 26 and 27). As further shown in at least FIGS. 12, 14, 22 and 24, the bottom wall 212 may have an opening 214 formed therein. As will be further described herein, the opening 214 formed in the bottom wall 212 may be disposed off-center with respect to a center of the cooking chamber 200. As a non-limiting example, the opening 214 formed in the bottom wall 212 may be disposed off-center such that a center of the opening 214 is disposed at a first distance away from the side wall 206, a second distance away from the side wall 202, and the first distance is substantially greater than the second distance.

Figure 23:
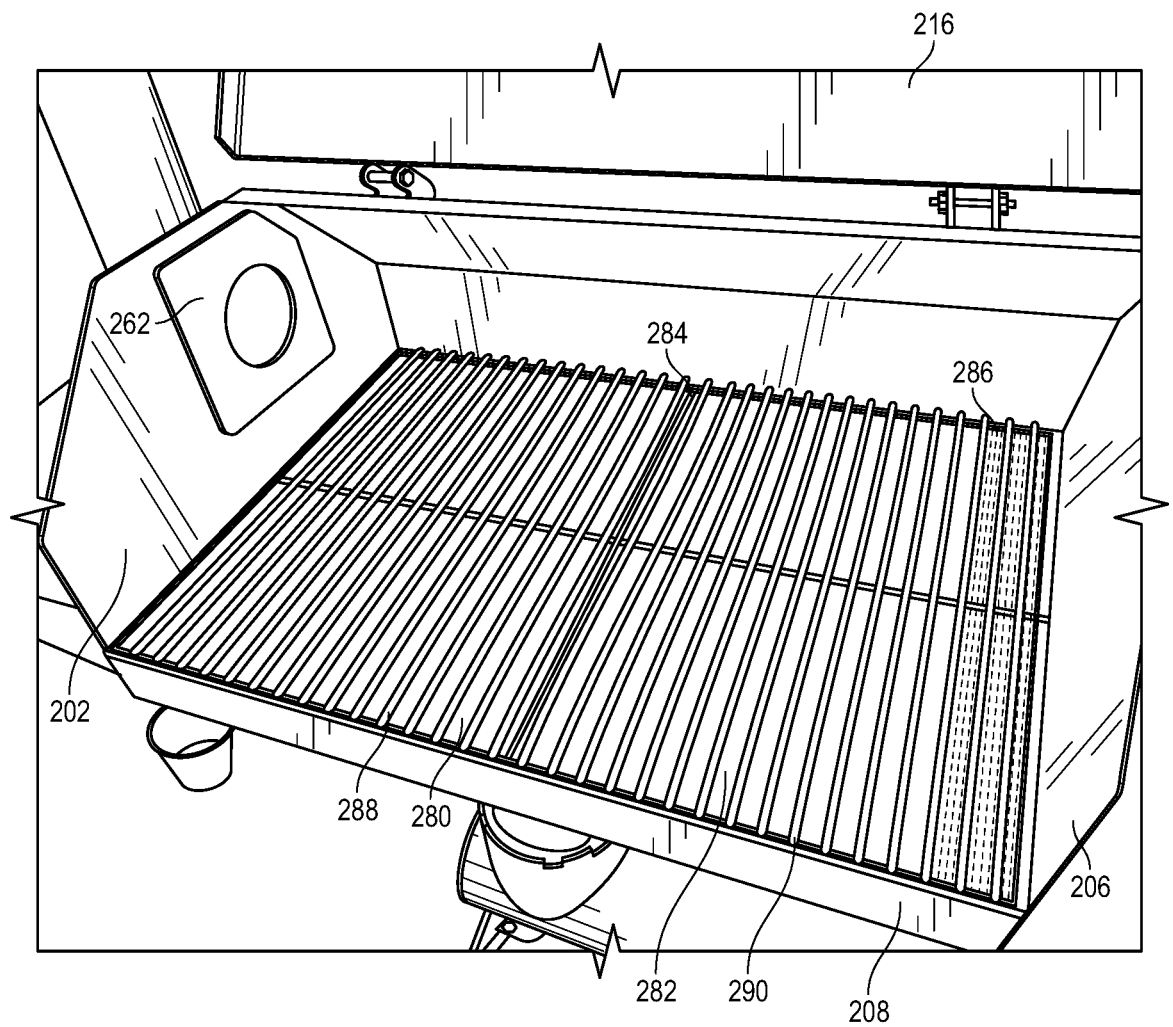
FIG. 23 is a perspective view illustrating at least one deflector plate and at least one grate of the cooking chamber disposed within the cooking chamber.
Figure 24:
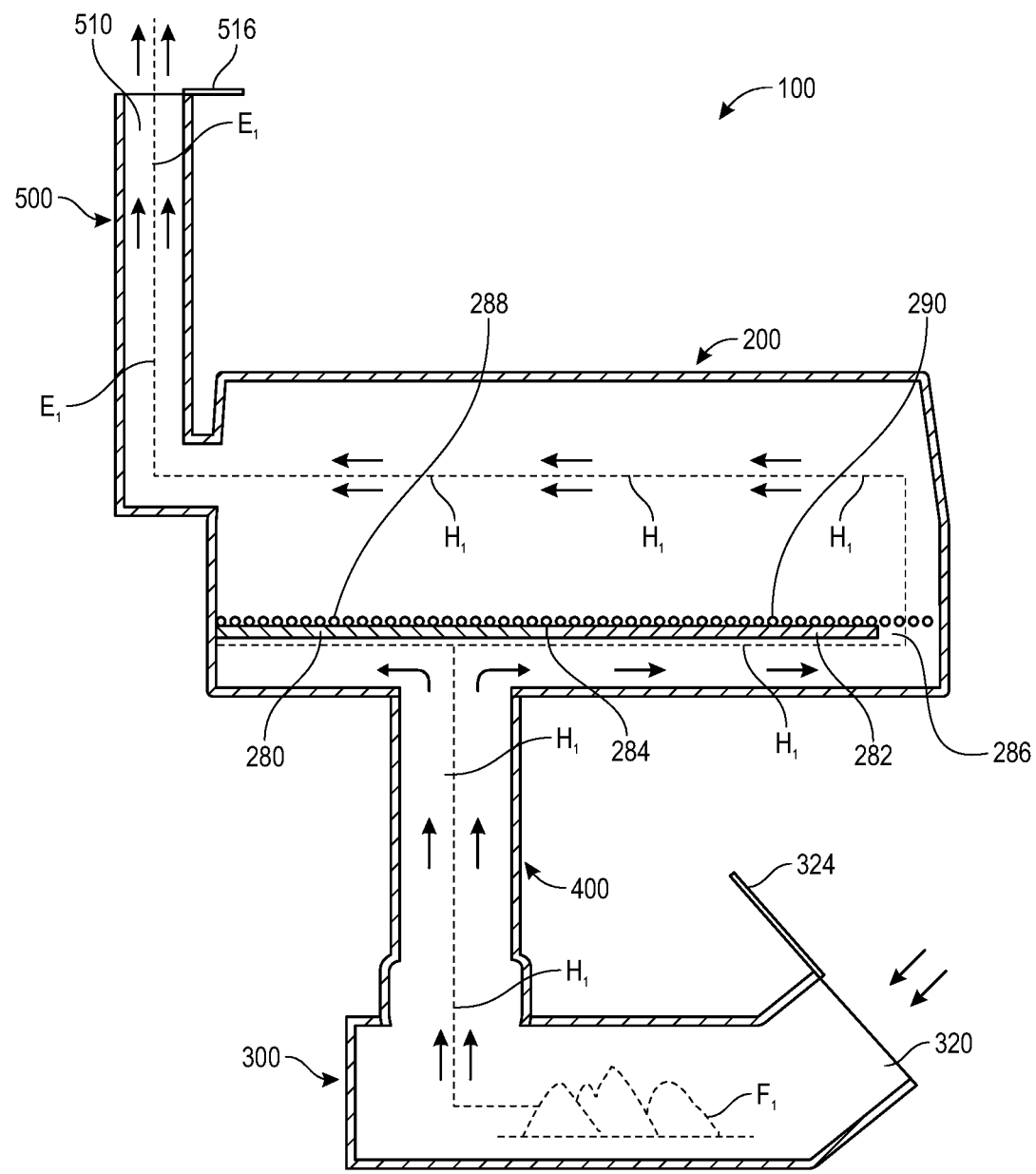
FIG. 24 is a schematic diagram of a front sectional view of the portable outdoor cooker with the plurality of support legs of the burn chamber omitted, which further schematically illustrates the damper plates of the burn chamber and the chimney secured in open positions, and which further schematically illustrates heat flowing throughout the portable outdoor cooker when solid combustible fuel is burned within the burn chamber.
Figure 25:
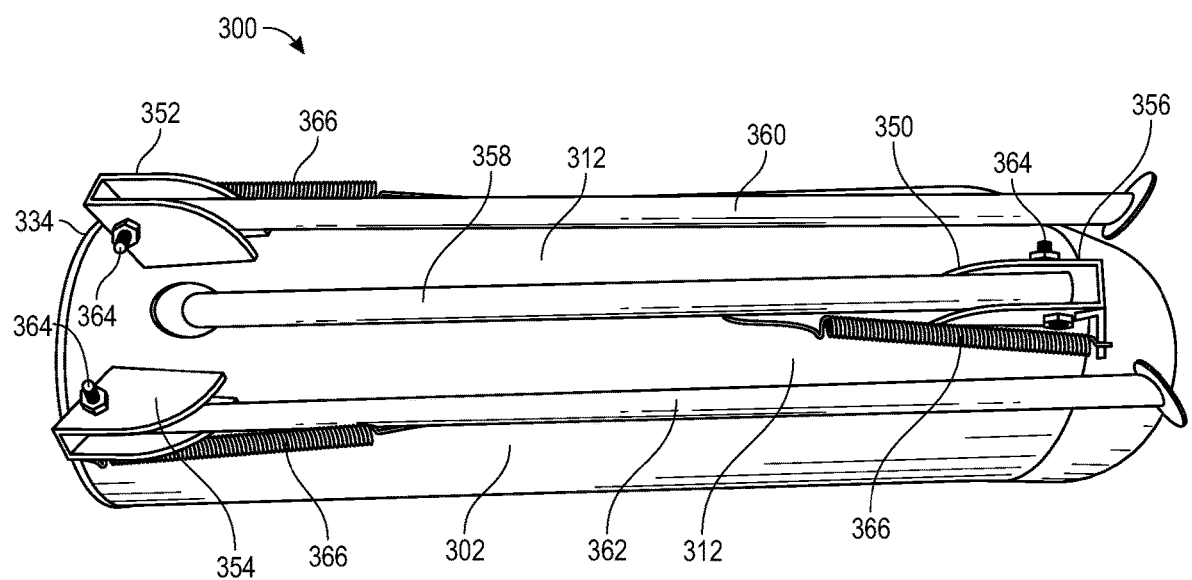
FIG. 25 is a perspective bottom view of the burn chamber shown in FIG. 8, which further illustrates a lower portion of the main body of the burn chamber and the plurality of support legs of the burn chamber in a non-supporting position.

As shown in at least FIGS. 1-7, 15, 23, 24, 26 and 27, the cooking chamber 200 may further include a top hood 216. The top hood 216 may include a lift handle 218 which may be operably coupled to the top hood 216. As a non-limiting example, respective fasteners 220, 222 may be fastened to respective lift handle mounting protrusions 224, 226 (e.g. which may be fixed to and protrude from an outer surface of the top hood 216) and to respective ends of the lift handle 218 to operably couple the lift handle 218 to the top hood 216. The lift handle 218 may be of any suitable shape and size and may be made from a material, or a combination of materials, such as a composite material, a plastic, a wood, a metal or any other suitable material. The top hood 216 may be movable with respect to at least the plurality of side walls 202, 204, 206, 208 and the bottom wall 212 of the cooking chamber 200, and may be selectively moved by a user (e.g. by the user grasping the lift handle 218) between an open position (e.g. as shown in at least FIGS. 23 and 26) and a closed position (e.g. as shown in at least FIGS. 1-7, 15, 24 and 27). As a non-limiting example, the top hood 216 may be pivotally coupled to the cooking chamber 200, such as by a pair of hinges 228, 230 of the cooking chamber 200, so as to be capable of pivoting between the open position and the closed position. Alternatively, as may be understood by one skilled in the art, the top hood 216 may be configured as a lift-off top hood (not shown) which is not pivotally coupled to the cooking chamber 200 and is capable of being selectively lifted off of, and entirely removed from, the cooking chamber 200. In either case, with the top hood 216 in the closed position, an interior space of the cooking chamber 200 is defined therein between at least the plurality of side walls 202, 204, 206, 208, the bottom wall 212 and the top hood 216. Furthermore, as shown in at least FIGS. 1-4 and 27, the top hood 216 may further include a thermometer 232 attached thereon which is capable of measuring an interior air/cooking temperature within the interior space of the cooking chamber 200, especially when the portable outdoor cooker 100 generates heat $H_1$ (e.g. as schematically shown in FIG. 24) for cooking food in the deployed use configuration, as will be further described herein.

As shown in at least FIGS. 3-7, the cooking chamber 200 may further include a plurality of carrying handles, such as carrying handles 234, 236, which may be operably coupled to the cooking chamber 200. As a non-limiting example, respective fasteners 238, 240 and 242, 244 may be fastened to respective carrying handle mounting protrusions 246, 248 and 250, 252 (e.g. which may be fixed to and protrude from respective outer surfaces of respective opposing side walls 202, 206 of the cooking chamber 200) and to respective ends of the respective carrying handles 234, 236 to operably couple the carrying handles 234, 236 to the cooking chamber 200. The carrying handles 234, 236 may be of any suitable shape and size and may be made from a material, or a combination of materials, such as a composite material, a plastic, a wood, a metal or any other suitable material. When grasped by the user, the carrying handles 234, 236 may advantageously assist the user in lifting, moving or carrying the cooking chamber 200, along with any components of the portable outdoor cooker 100 which may be stowed within the cooking chamber 200, especially when the portable outdoor cooker 100 is in the collapsed non-use configuration, as will be further described herein.

Figure 12:
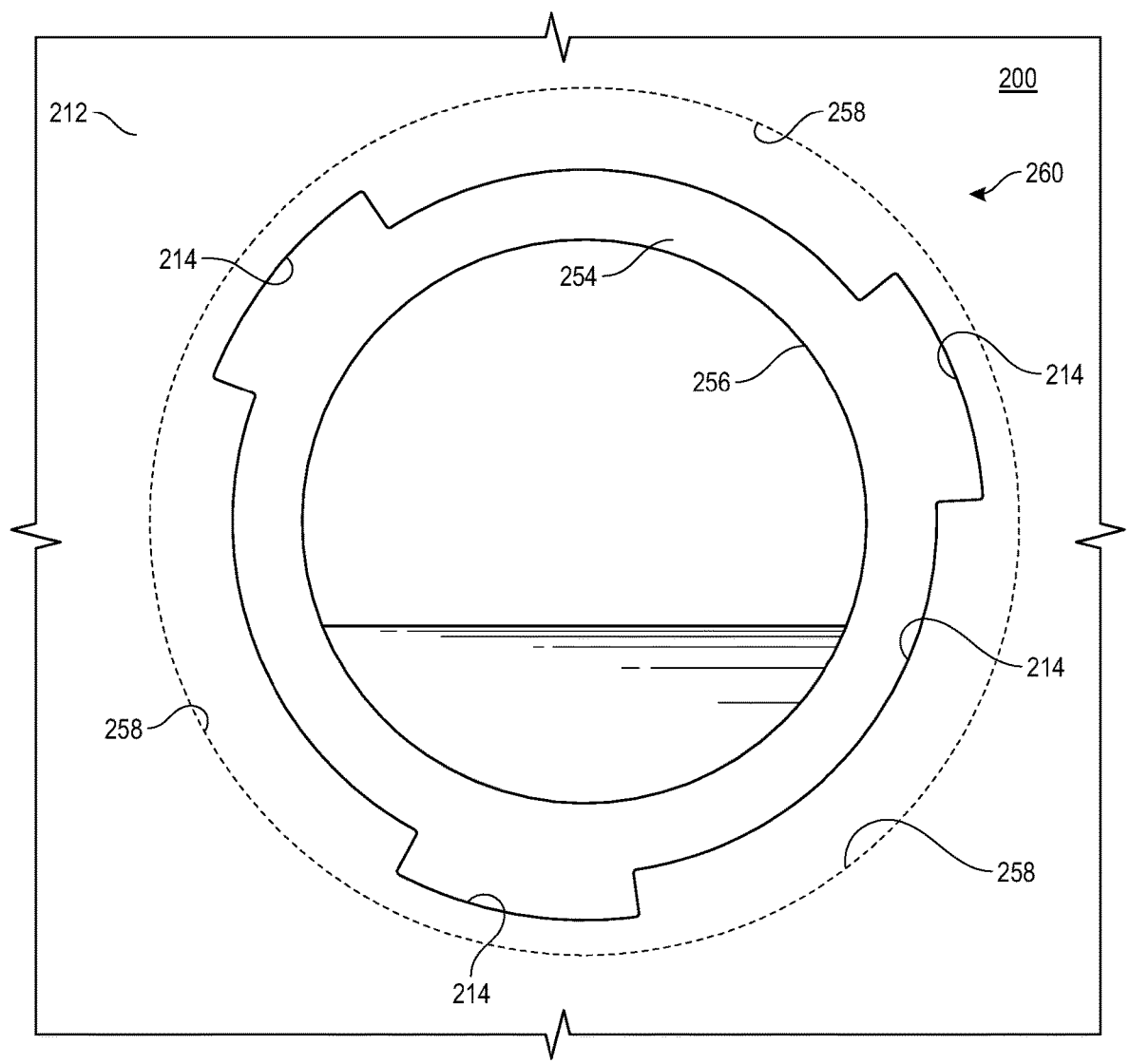
FIG. 12 is a bottom view of a portion of a bottom wall of the cooking chamber, which further illustrates an opening formed in the bottom wall and a first portion of a cooking chamber-riser interlock joint.
Figure 14:
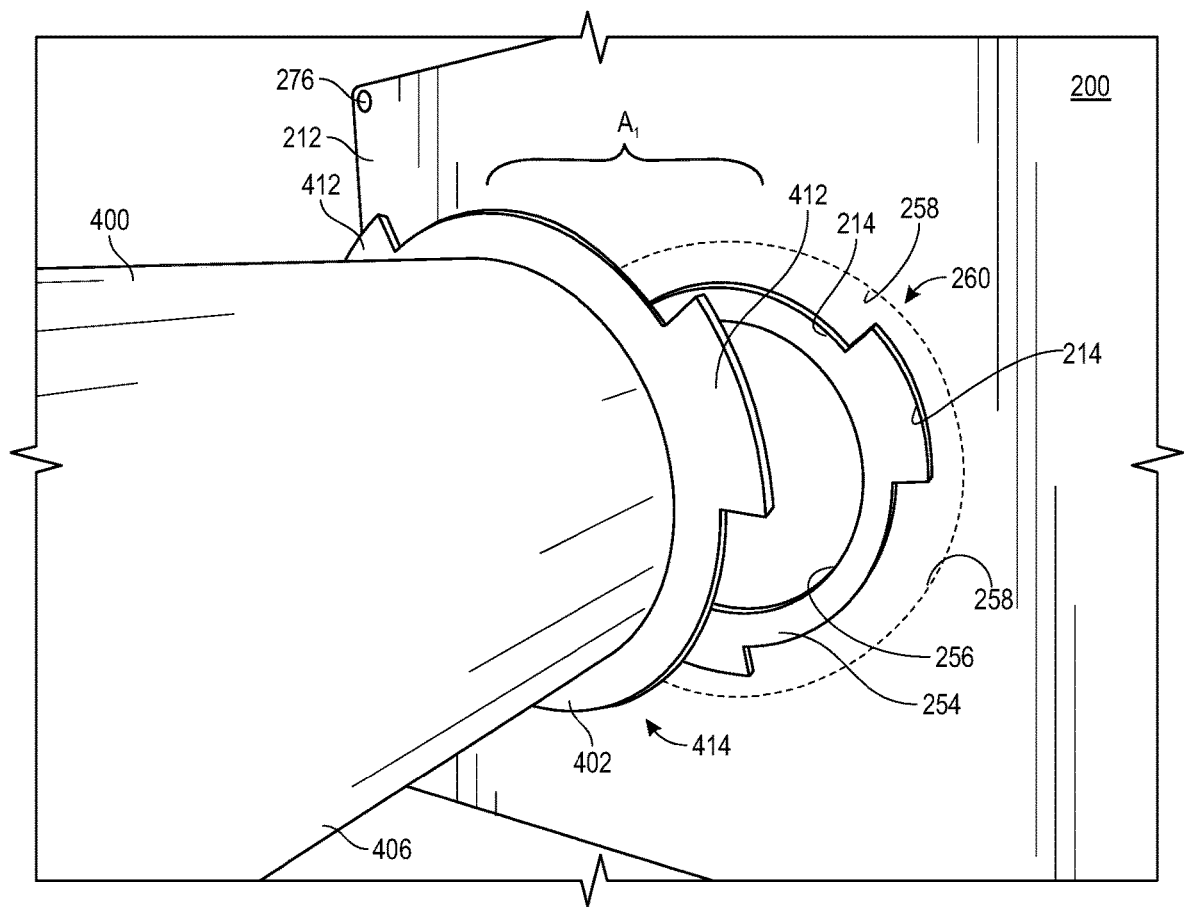
FIG. 14 is a perspective view illustrating the upper end portion of the riser shown in FIGS. 10, 11 and 13 generally aligned with the opening formed in the bottom wall of the cooking chamber shown in FIG. 12 before the first and second portions of the cooking chamber-riser interlock joint are engaged to removably couple the upper end portion of the riser to the cooking chamber at the opening formed in the bottom wall of the cooking chamber.
Figure 15:
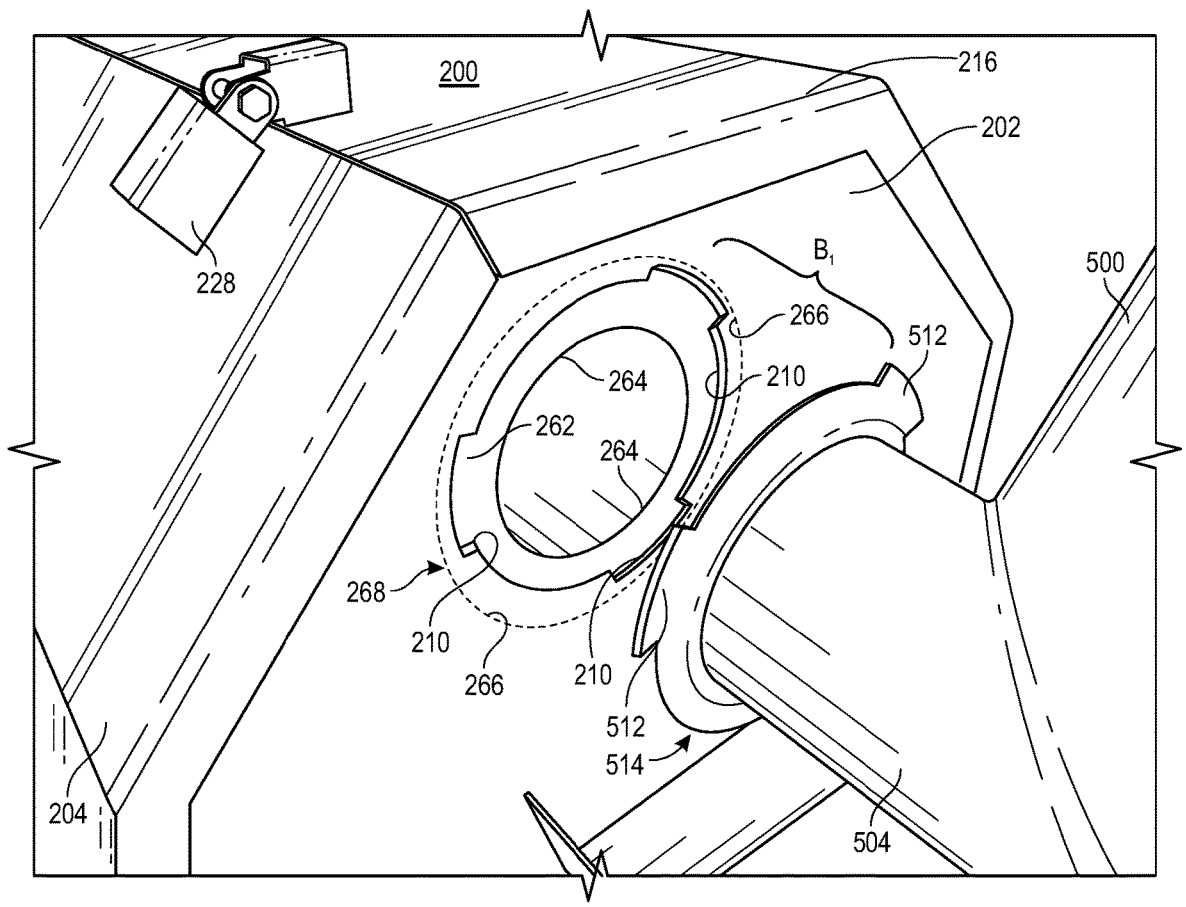
FIG. 15 is a perspective view illustrating an opening formed in a side wall of the cooking chamber, a chimney of the portable outdoor cooker and first and second portions of a cooking chamber-chimney interlock joint, and further illustrating a lower end portion of the chimney generally aligned with the opening formed in the side wall of the cooking chamber before the first and second portions of the cooking chamber-chimney interlock joint are engaged to removably couple the lower end portion of the chimney to the cooking chamber at the opening formed in the side wall of the cooking chamber.
Figure 19:
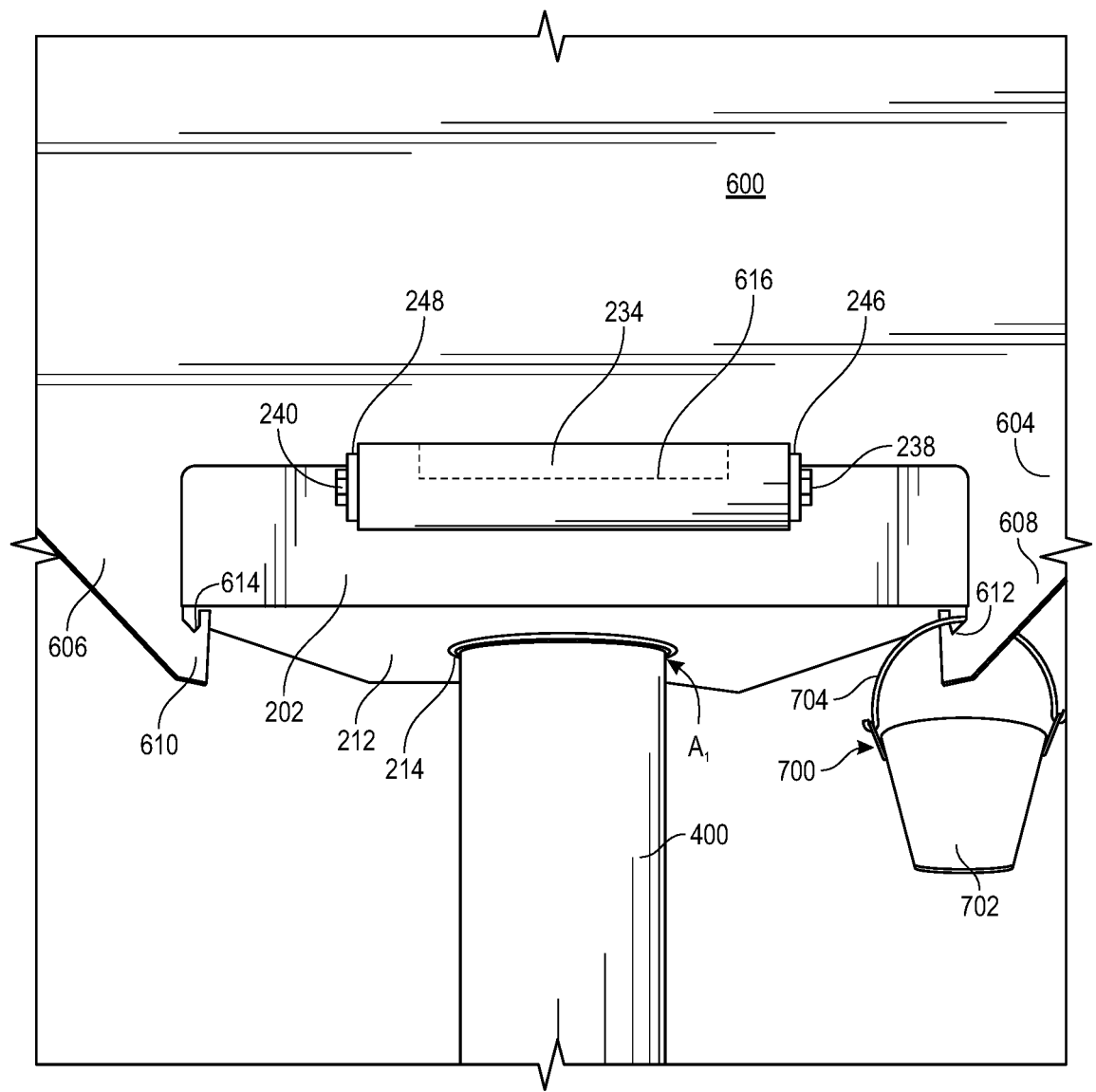
FIG. 19 is a perspective end view beneath the shelf shown in FIG. 18 and the cooking chamber, which further illustrates the shelf removably coupled to the cooking chamber and the riser removably coupled to the cooking chamber.
Figure 21:
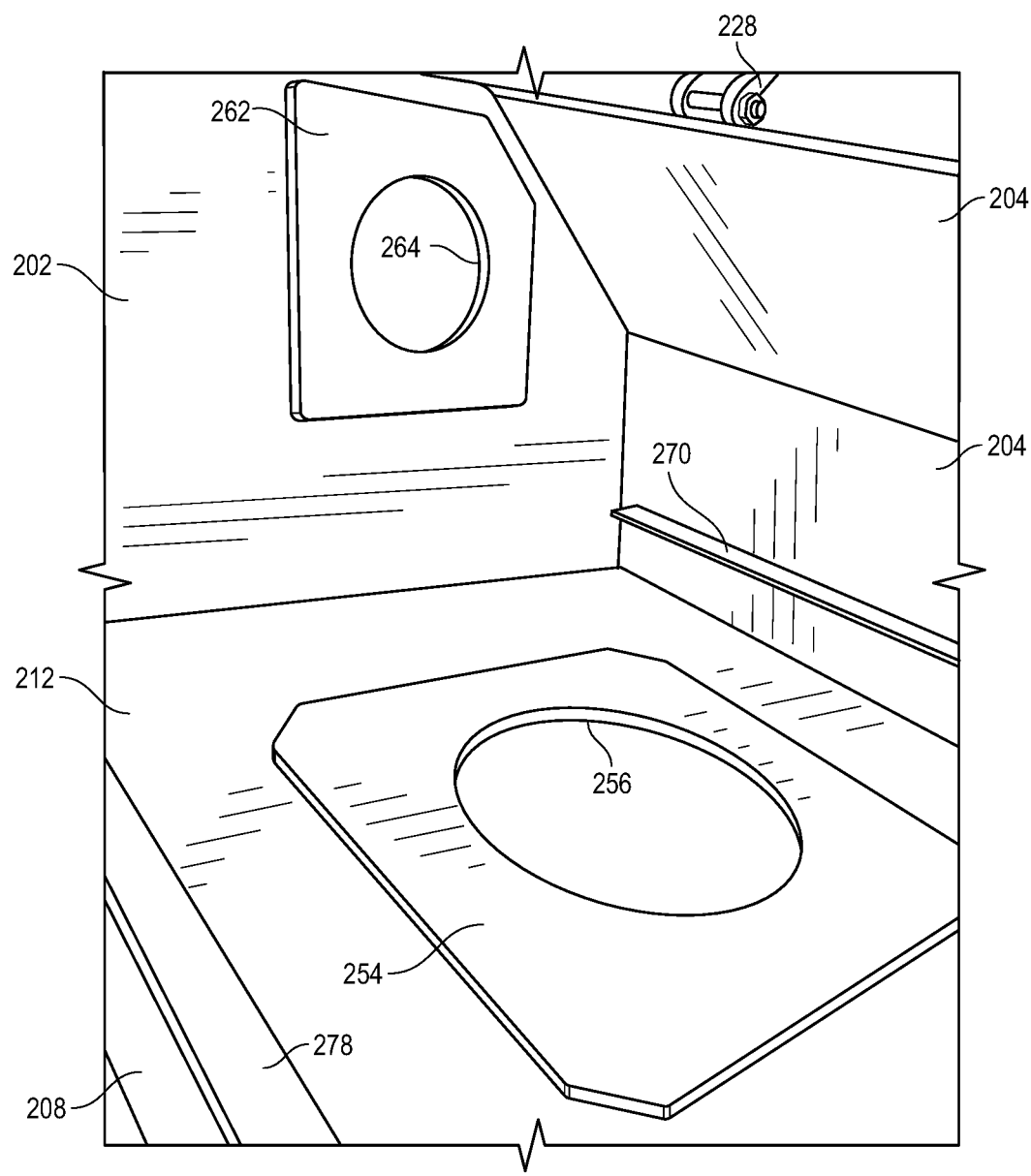
FIGS. 21 and 22 are perspective views of interior portions within the cooking chamber, which illustrate various interior structural components of the cooking chamber.
Figure 22:
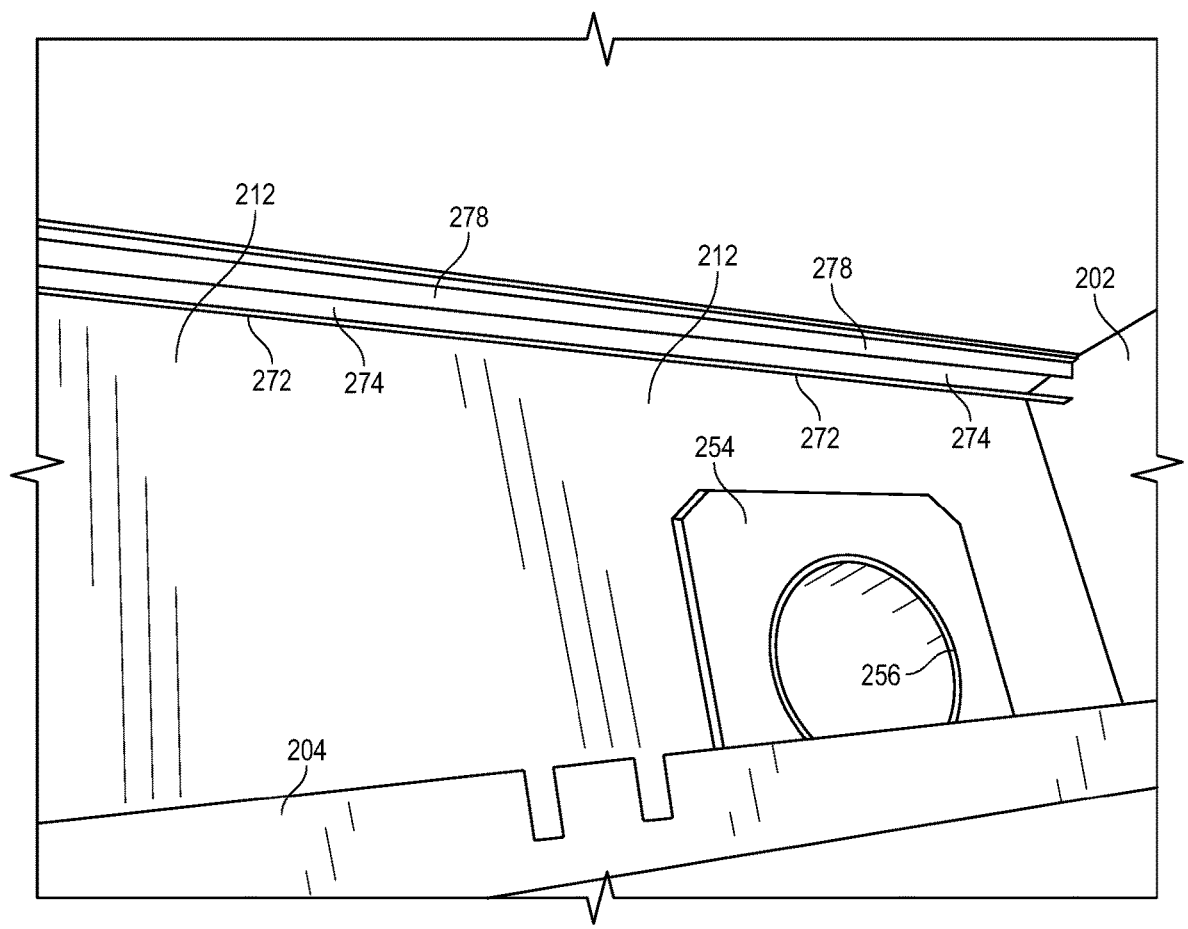

Referring now to at least FIGS. 12, 14, 15, 19 and 21-23, interior portions within the cooking chamber 200 (i.e. within the interior space of the cooking chamber 200) are shown in various views, particularly in FIGS. 21-23. As shown in FIG. 21, the cooking chamber 200 may further include a bottom wall reinforcement layer 254, such as on an upper side of the bottom wall 212 of the cooking chamber 200. The bottom wall reinforcement layer 254 may be generally planar and/or plate-like and may have an opening 256 formed therein which is at least generally aligned with, and corresponds to, the opening 214 formed in the bottom wall 212. The bottom wall reinforcement layer 254 may advantageously provide additional reinforcement by increasing strength and rigidity of an area of the bottom wall 212 which generally surrounds the opening 214 formed in the bottom wall 212. As non-limiting examples, the bottom wall reinforcement layer 254 may be formed integrally as part of the upper side of the bottom wall 212 or may be fixed on the upper side of the bottom wall 212 by various fasteners (e.g. rivets), welding or the like, as may be understood by one skilled in the art. As shown in FIGS. 12, 14 and 19, the cooking chamber 200 may further include a bottom wall slot 258 which may be formed in between the bottom wall 212 and the bottom wall reinforcement layer 254 so as to surround at least the opening 214 formed in the bottom wall 212 and the opening 256 formed in the bottom wall reinforcement layer 254. The bottom wall slot 258, together with at least the opening 214 formed in the bottom wall 212 of the cooking chamber 200, may form at least part of a first portion 260 of a cooking chamber-riser interlock joint $A_1$, as will be further described herein. As such, as may be understood by one skilled in the art, the opening 214 formed in the bottom wall 212 may be shaped and sized according to the particular design and/or configuration of the first portion 260 of the cooking chamber-riser interlock joint $A_1$, as will also be further described herein.

As further shown in FIG. 21, the cooking chamber 200 may further include a side wall reinforcement layer 262, such as on an inner side of the side wall 202 of the cooking chamber 200. The side wall reinforcement layer 262 may be generally planar and/or plate-like and may have an opening 264 formed therein which is at least generally aligned with, and corresponds to, the opening 210 formed in the side wall 202. The side wall reinforcement layer 262 may advantageously provide additional reinforcement by increasing strength and rigidity of an area of the side wall 202 which generally surrounds the opening 210 formed in the side wall 202. As non-limiting examples, the side wall reinforcement layer 262 may be formed integrally as part of the inner side of the side wall 202 or may be fixed on the inner side of the side wall 202 by various fasteners (e.g. rivets), welding or the like, as may be understood by one skilled in the art. As shown in FIG. 15, the cooking chamber 200 may further include a side wall slot 266 which may be formed in between the side wall 202 and the side wall reinforcement layer 262 so as to surround at least the opening 210 formed in the side wall 202 and the opening 264 formed in the side wall reinforcement layer 262. The side wall slot 266, together with at least the opening 210 formed in the side wall 202 of the cooking chamber 200, may form at least part of a first portion 268 of a cooking chamber-chimney interlock joint $B_1$, as will be further described herein. As such, as may be understood by one skilled in the art, the opening 210 formed in the side wall 202 may be shaped and sized according to the particular design and/or configuration of the first portion 268 of the cooking chamber-chimney interlock joint $B_1$, as will also be further described herein.

As shown in FIGS. 21-23, the cooking chamber 200 may further include a first deflector plate support rail 270 disposed within the interior space of the cooking chamber 200 and a second deflector plate support rail 272 disposed within the interior space of the cooking chamber 200. As shown in FIGS. 21 and 22, the second deflector plate support rail 272 may be spaced apart from the first deflector plate support rail 270. The second deflector plate support rail 272 may form at least part of a drip-collecting channel 274 disposed within the interior space of the cooking chamber 200. The drip-collecting channel 274 may be disposed proximate to a drip outlet 276 formed in the cooking chamber 200, such as in the bottom wall 212 of the cooking chamber 200. The cooking chamber 200 may further include a grate support rail 278 disposed within the interior space of the cooking chamber 200. As shown in FIG. 22, the grate support rail 278 may be disposed above the second deflector plate support rail 272. As non-limiting examples, the first deflector plate support rail 270 may be formed integrally as part of the side wall 204 and/or as part of the bottom wall 212, or the first deflector plate support rail 270 may be fixed on the side wall 204 and/or fixed on the bottom wall 212 by various fasteners (e.g. rivets), welding or the like, as may be understood by one skilled in the art. Similarly, as non-limiting examples, the second deflector plate support rail 272 may be formed integrally as part of the side wall 208 and/or as part of the bottom wall 212, or the second deflector plate support rail 272 may be fixed on the side wall 208 and/or fixed on the bottom wall 212 by various fasteners (e.g. rivets), welding or the like, as may be understood by one skilled in the art. Furthermore, as non-limiting examples, the grate support rail 278 may be formed integrally as part of the side wall 208 and/or as part of the bottom wall 212, or the grate support rail 278 may be fixed on the side wall 208 and/or fixed on the bottom wall 212 by various fasteners (e.g. rivets), welding or the like, as may be understood by one skilled in the art.

As shown in FIG. 23, the cooking chamber 200 may further include at least one deflector plate, such as deflector plates 280, 282. As non-limiting examples, the deflector plates 280, 282 may each be generally planar and/or plate-like and may be made from a material such as steel, stainless steel, aluminum or any other suitable material, as may be understood by one skilled in the art. The deflector plates 280, 282 may each be shaped and sized so as to be capable of being placed and supported on the first deflector plate support rail 270 and on the second deflector plate support rail 272. When supported on each of the first and second deflector plate support rails 270, 272, each of the deflector plates 280, 282 may slope downwardly, or generally downwardly, towards the second deflector plate support rail 272 and thus towards the drip-collecting channel 274, as will be further described herein. Furthermore, according to preferences of the user (e.g. to achieve certain desired cooking results, etc. which may be based on an amount of heat flow, a distribution of heat flow and/or temperature within the cooking chamber 200 when the portable outdoor cooker 100 generates heat $H_1$ for cooking), each of the deflector plates 280, 282 may be selectively moved and positioned along the respective first and second deflector plate support rails 270, 272 so as to form at least one heat flow gap, such as heat flow gaps 284, 286 shown in FIG. 23. The heat flow gaps 284, 286 are each capable of allowing heat $H_1$ provided from the burn chamber 300 to flow upwardly therethrough (i.e. from beneath the deflector plates 280, 282) and further into the cooking chamber 200 throughout the interior space of the cooking chamber 200 disposed above the deflector plates 280, 282 (e.g. as schematically shown in FIG. 24). In the example shown in FIG. 23, each of the deflector plates 280, 282 are positioned on the respective first and second deflector plate support rails 270, 272 such that the heat flow gap 284 is substantially closed and the heat flow gap 286 is substantially open, thus guiding heat $H_1$ provided from the burn chamber 300 to flow mostly through gap 286 and enabling the heat $H_1$ to be more evenly distributed across the bottoms of each deflector plate 280, 282 (e.g. as schematically shown in FIG. 24). In either case, the deflector plates 280, 282 may be advantageously capable of at least distributing and/or guiding heat $H_1$ provided from the burn chamber 300, particularly in a manner which corresponds to the size of each heat flow gap 284, 286 as a result of the selected position of each deflector plate 280, 282 supported on the respective first and second deflector plate support rails 270, 272. Furthermore, as may be understood by one skilled in the art, the deflector plates 280, 282 may be advantageously capable of preventing and/or minimizing undesired flare-ups from the burn chamber 300 when the portable outdoor cooker 100 generates heat $H_1$ for cooking food in the deployed use configuration, as will also be further described herein.

As further shown in FIG. 23, the cooking chamber 200 may further include at least one grate, such as grates 288, 290. As non-limiting examples, the grates 288, 290 may each be made from a material, or a combination of materials, such as cast iron, porcelain-coated cast iron, steel, porcelain-coated steel, stainless steel or any other suitable material, as may be understood by one skilled in the art. The grates 288, 290 may each be shaped and sized so as to be capable of being placed and supported on respective top edges and/or top surfaces of the respective deflector plates 280, 282 and on the grate support rail 278. The grates 288, 290 are each capable of supporting food thereon for being cooked, especially when the portable outdoor cooker 100 generates heat $H_1$ for cooking food in the deployed use configuration, as will be further described herein. As such, when the portable outdoor cooker 100 is in the deployed use configuration and food is supported on the grates 288, 290 and cooked within the cooking chamber 200, any juice and/or grease which may accumulate and drip from the food is capable of running down the generally downwardly-sloped deflector plates 280, 282, into the drip-collecting channel 274, and out of the cooking chamber 200 through the drip outlet 276.

With regard to the overall construction of the cooking chamber 200, at least the plurality of side walls 202, 204, 206, 208, the bottom wall 212 and the top hood 216 of the cooking chamber 200 may be rigid, thus advantageously providing the cooking chamber 200 with increased overall, stiffness, strength and stability, especially when the portable outdoor cooker 100 is in the deployed use configuration. As non-limiting examples, at least the plurality of side walls 202, 204, 206, 208, the bottom wall 212 and the top hood 216 of the cooking chamber 200 may be made from a material, or combination of materials, such as steel, stainless steel, aluminum or any other suitable material, as may be understood by one skilled in the art. Additionally, various manufacturing processes, or combination of manufacturing processes, such as machining, casting, extruding, bending, cutting, welding, riveting or other suitable manufacturing process may be employed to construct the cooking chamber 200, as may be understood by one skilled in the art. Furthermore, as non-limiting examples, the outer and/or inner surfaces of at least the plurality of side walls 202, 204, 206, 208, the bottom wall 212 and the top hood 216 of the cooking chamber 200 may be coated with a protective coating such as a high-temperature powder coating, a high-temperature paint or other suitable coating, as may be understood by one skilled in the art. Furthermore, as may be understood by one skilled in the art, the cooking chamber 200 may be of any suitable shape and size, although preferably shaped and sized so as to be capable of being conveniently handled, transported and stored, especially when the portable outdoor cooker 100 is in the collapsed non-use configuration (e.g. as shown in FIGS. 26 and 27), as will be further described herein.

Referring now to at least FIGS. 1-9, 11 and 24-27, the burn chamber 300 of the portable outdoor cooker 100 is shown in several views. The burn chamber 300 may include a main body 302. The main body 302 may have a first end portion 304, a second end portion 306 disposed opposite to the first end portion 304 and a substantially elongated portion 308 extending between at least the first and second end portions 304, 306. As shown in at least FIG. 8, the substantially elongated portion 308 extending between at least the first and second end portions 304, 306 of the main body 302 may be tubular. The main body 302 may further have an upper portion 310, which may extend generally upwardly from the substantially elongated portion 308 of the main body 302, and a lower portion 312. As further shown in at least FIG. 8, the upper portion 310 of the main body 302 may be tubular. The main body 302 of the burn chamber 300 may further have an interior space defined therein throughout the main body 302 between at least the first and second end portions 304, 306, the upper portion 310 and the lower portion 312. As shown in at least FIGS. 8 and 9, the upper portion 310 of the main body 302 of the burn chamber 300 may have an opening 314 formed therein. As will be further described herein, the opening 314 formed in the upper portion 310 of the main body 302 may be disposed off-center with respect to a center of the main body 302 of the burn chamber 300. As a non-limiting example, the opening 314 formed in the upper portion 310 of the main body 302 may be disposed off-center such that a center of the opening 314 is disposed at a first distance away from the first end portion 304 of the main body 302, a second distance away from the second end portion 306 of the main body 302, and the first distance is substantially greater than the second distance. As shown in at least FIGS. 9 and 11, the upper portion 310 of the main body 302 may further include a plurality of notches 316 formed therein which may surround the opening 314 formed in the upper portion 310. The plurality of notches 316, together with the opening 314 formed in the upper portion 310 of the main body 302, may form at least part of a first portion 318 of a burn chamber-riser interlock joint $C_1$, as will be further described herein. As such, as may be understood by one skilled in the art, the opening 314 formed in the upper portion 310 of the main body 302 may be shaped and sized according to the particular design and/or configuration of the first portion 318 of the burn chamber-riser interlock joint $C_1$, as will also be further described herein.

Figure 8:
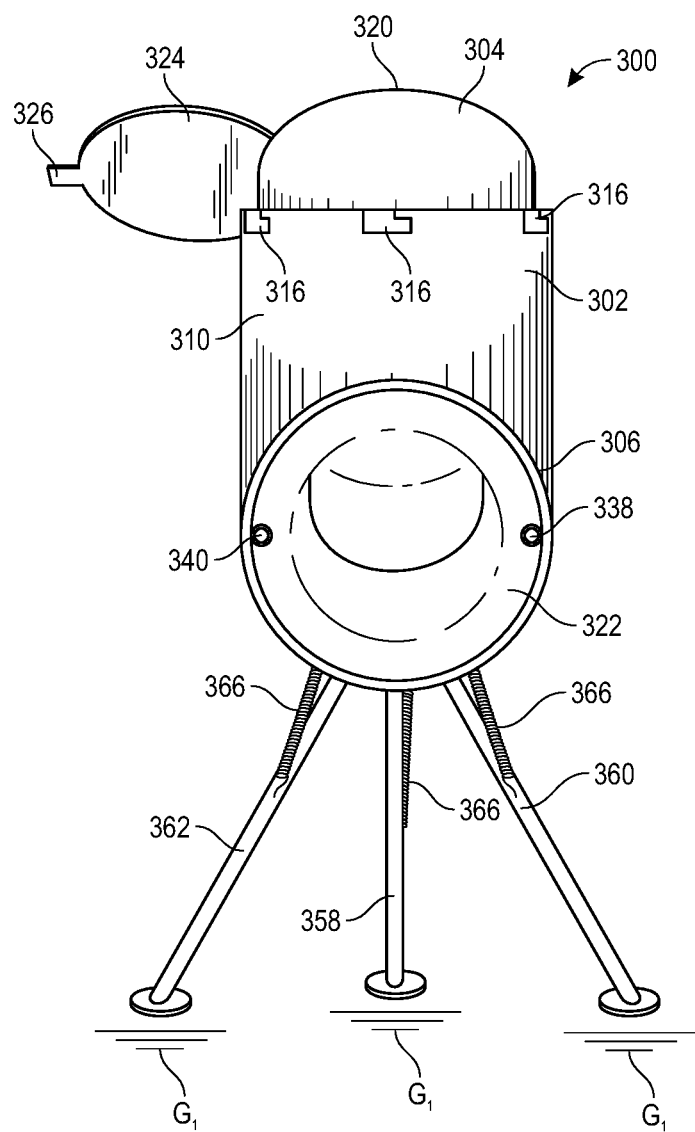
FIG. 8 is an end view of a burn chamber of the portable outdoor cooker, which illustrates a plurality of support legs of the burn chamber in a supporting position, and which further illustrates a damper plate of the burn chamber secured in an open position and an access cover plate of the burn chamber removed from a main body of the burn chamber and omitted from the figure for illustrative purposes.
Figure 9:
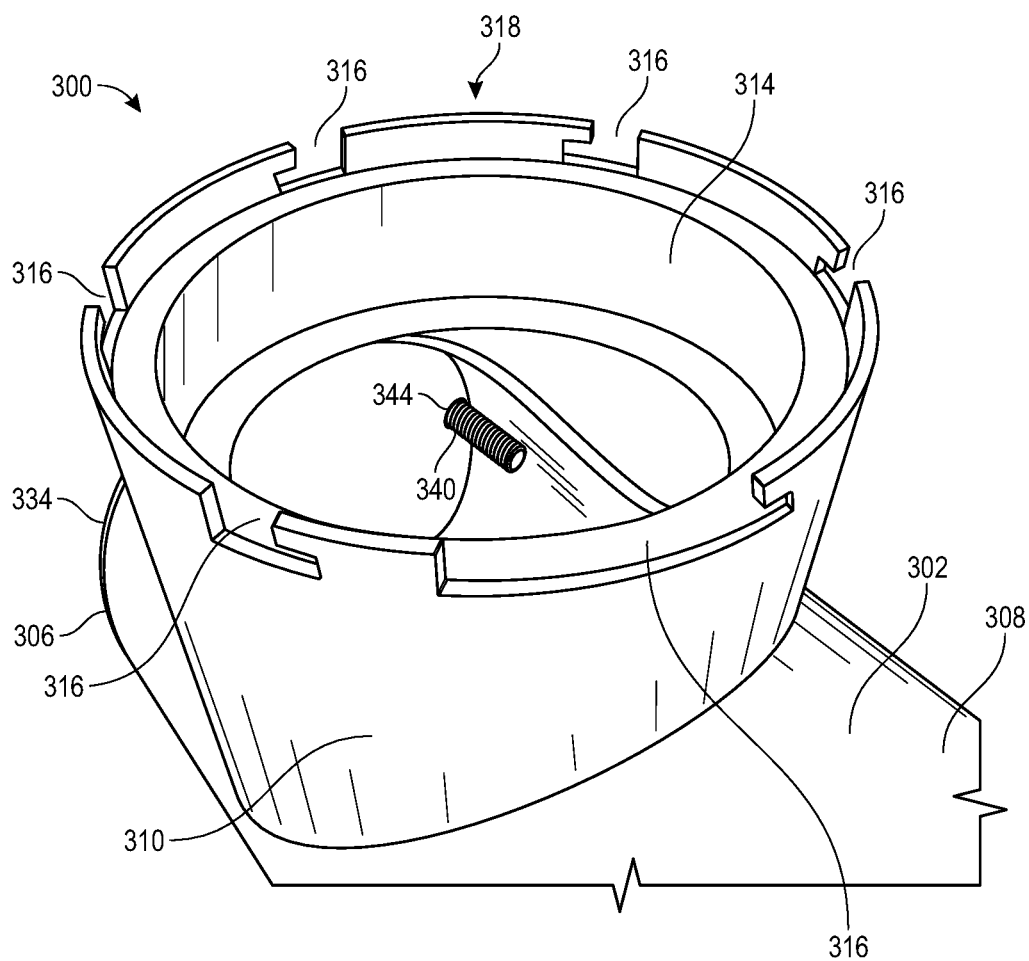
FIG. 9 is a perspective view of an upper portion of a main body of the burn chamber shown in FIG. 8, which further illustrates an opening formed in the upper portion of the main body and a first portion of a burn chamber-riser interlock joint.

As shown in FIGS. 8 and 24, the first and second end portions 304, 306 of the main body 302 of the burn chamber 300 may have respective first and second access openings 320, 322 formed therein. The first access opening 320 may permit access into the interior space of the main body 302 so as to permit the user to insert and load at least solid combustible fuel $F_1$ (e.g. one or more pieces of various types of wood which are typically readily-available, plentiful and/or inexpensive such as, but not limited to, oak, hickory, maple, mesquite, pecan, apple, alder, cherry, peach, etc.—as schematically shown in FIG. 24) into the interior space of the main body 302. As such, as a non-limiting example, the first end portion 304 of the main body 302 of the burn chamber 300 may be angled to slope generally upwardly from the substantially elongated portion 308 of the main body 302, thus making it more convenient for the user to insert and load at least the solid combustible fuel $F_1$ through the first access opening 320 and into the interior space of the main body 302. Once loaded into the interior space of the main body 302 of the burn chamber 300, the solid combustible fuel $F_1$ may be ignited (e.g. by the user) and burned to generate and provide heat $H_1$ for cooking (e.g. as schematically shown in FIG. 24), especially when the portable outdoor cooker 100 is in the deployed use configuration, as will be further described herein. The first access opening 320 may also permit the user to clean out the interior space of the main body 302 of the burn chamber 300 (e.g. so as to remove ashes, unburned solid combustible fuel $F_1$, etc.), as may be understood by one skilled in the art. Similarly, the second access opening 322 may further permit access into the interior space of the main body 302 so as to permit the user to clean out the interior space of the main body 302 of the burn chamber 300 (e.g. so as to remove ashes, unburned solid combustible fuel $F_1$, etc.). As such, the main body 302 of the burn chamber 300 having both of the first and second access openings 320, 322 formed therein may advantageously provide the user with more options to conveniently access the interior space of the main body 302 for various purposes, such as described herein.

As shown in at least FIGS. 2, 6-8 and 24, the burn chamber 300 may further include a damper plate 324. The damper plate 324 may include a handle portion 326 extending therefrom. The damper plate 324 may be movably coupled (e.g. pivotally coupled) to the main body 302 of the burn chamber 300. As a non-limiting example, a threaded rod 328 may be fixed (e.g. by welding) to an inner surface of the first end portion 304 of the main body 302 of the burn chamber 300. The threaded rod 328 may be capable of extending through a hole 330 formed in the damper plate 324. As such, the damper plate 324 may be movably coupled to the main body 302 of the burn chamber 300 by aligning the hole 330 formed in the damper plate 324 with the threaded rod 328, inserting the threaded rod 328 through the hole 330 formed in the damper plate 324, and at least partially tightening a wing nut 332 onto the threaded rod 328. When the damper plate 324 is movably coupled to the main body 302 of the burn chamber 300, the damper plate 324 may therefore be disposed adjacent to, and may partially or fully cover, the first access opening 320 formed in the first end portion 304 of the main body 302. As such, with the wing nut 332 partially tightened, the damper plate 324 may be selectively moved (e.g. pivoted about the threaded rod 328 by the user grasping the handle portion 326) between a plurality of positions with respect to the first access opening 320 of the main body 302.

More specifically, the damper plate 324 of the burn chamber 300 may be selectively moved and then secured (e.g. by the user fully tightening the wing nut 332 onto the threaded rod 328) into an open position which permits access to the first access opening 320 (e.g. to permit at least solid combustible fuel $F_1$ to be loaded into the interior space of the main body 302 through the first access opening 320). Furthermore, the damper plate 324 may be selectively moved and then secured (e.g. by the user fully tightening the wing nut 332 onto the threaded rod 328) into various other open positions so as to adjust an amount of air flow to be let into the interior space of the main body 302 of the burn chamber 300 (i.e. through the first access opening 320) from outside of the main body 302, as schematically shown in FIG. 24. As such, when the portable outdoor cooker 100 is in the deployed use configuration and solid combustible fuel $F_1$ is loaded, ignited and burned within the burn chamber 300 to generate heat $H_1$ for cooking food, the intensity of the flame generating the heat $H_1$ provided from the burn chamber 300 to the cooking chamber 200 (as schematically shown in FIG. 24), may be advantageously adjusted (i.e. depending on an amount of air flow let into the interior space of the main body 302 of the burn chamber 300), which may further adjust at least a cooking temperature within the cooking chamber 200. In this manner, when solid combustible fuel $F_1$ is loaded, ignited and burned within the interior space of the main body 302 of the burn chamber 300 to generate heat $H_1$ for cooking food in the cooking chamber 200, a greater amount of air flow let into the interior space of the main body 302 (i.e. by adjusting the position of the damper plate 324 with respect to the first access opening 320) may result in the flame intensity to be greater, thus generating a greater amount of heat $H_1$. Alternatively, a lesser amount of air flow let into the interior space of the main body 302 of the burn chamber 300 (i.e. by adjusting the position of the damper plate 324 with respect to the first access opening 320) may result in the flame intensity to be lesser, thus generating a lesser amount of heat $H_1$. In this manner, the user may therefore have the capability to adjust at least a cooking temperature within the cooking chamber 200 based on at least the selected position of the damper plate 324 with respect to the first access opening 320, as may be understood by one skilled in the art. As may also be understood by one skilled in the art, the damper plate 324 may be selectively moved and then secured (e.g. by the user fully tightening the wing nut 332 onto the threaded rod 328) into a fully closed position with respect to the first access opening 320, such as when the portable outdoor cooker 100 is in the deployed use configuration but is not yet loaded and/or ignited for cooking food (e.g. as shown in FIGS. 1-7), or when the portable outdoor cooker 100 is in the collapsed non-use configuration (e.g. as shown in FIGS. 26 and 27).

As further shown in at least FIGS. 2, 6-8 and 24, the burn chamber 300 may further include an access cover plate 334.

The access cover plate 334 may be removably coupled to the main body 302 of the burn chamber 300. As a non-limiting example, respective threaded rods 338, 340 may be fixed (e.g. by welding) to respective inner surfaces of the second end portion 306 of the main body 302 of the burn chamber 300, as shown particularly in FIG. 8. The respective threaded rods 338, 340 may be capable of extending through respective holes 342, 344 formed in the access cover plate 334. As such, the access cover plate 334 may be removably coupled to the main body 302 of the burn chamber 300 by aligning the respective holes 342, 344 formed in the access cover plate 334 with the respective threaded rods 338, 340, inserting the respective threaded rods 338, 340 through the respective holes 342, 344 formed in the access cover plate 334, and tightening respective wing nuts 346, 348 onto the respective threaded rods 338, 340. When the access cover plate 334 is removably coupled to the main body 302 of the burn chamber 300 (e.g. as shown in FIGS. 1-5 and 7), the access cover plate 334 may therefore be disposed adjacent to, and fully cover, the second access opening 322 formed in the second end portion 306 of the main body 302, especially when the portable outdoor cooker 100 generates heat $H_1$ for cooking food in the deployed use configuration, as will be further described herein. Furthermore, as shown in FIG. 8, the access cover plate 334 may be selectively decoupled and removed from the main body 302 of the burn chamber 300 (e.g. by the user loosening and removing the respective wing nuts 346, 348 from the respective threaded rods 338, 340 and further grasping the access cover plate 334 to pull the access cover plate 334 away from the main body 302), which may permit access to the second access opening 322 (e.g. to further permit access into the interior space of the main body 302 so as to permit at least cleaning out the interior space of the main body 302, as previously described herein).

As shown in at least FIGS. 1-8, 25 and 26, the lower portion 312 of the main body 302 of the burn chamber 300 may have a plurality of leg-retaining protrusions 350, 352, 354 extending from the lower portion 312. At least one of the leg-retaining protrusions 350, 352, 354 of the lower portion 312 of the main body 302 may have a lowermost surface 356 of the main body 302 defined thereon. In the example shown throughout FIGS. 1-9, 11 and 24-27, and particularly in FIG. 25, the leg-retaining protrusion 350 may have a lowermost edge having the lowermost surface 356 of the lower portion 312 of the main body 302 defined thereon, as will be further discussed herein. The burn chamber 300 may further include a plurality of support legs 358, 360, 362. Each of the plurality of support legs 358, 360, 362 may be movable with respect to the main body 302 of the burn chamber 300. As a non-limiting example, each of the respective plurality of support legs 358, 360, 362 of the burn chamber 300 may be pivotally coupled (e.g. by a plurality of fasteners 364) to each of the respective leg-retaining protrusions 350, 352, 354 of the lower portion 312 of the main body 302 so as to be capable of pivoting outwardly and away from the lower portion 312 of the main body 302 (e.g. as shown in at least FIGS. 1-8) or inwardly towards the lower portion 312 of the main body 302 (e.g. as shown in at least FIG. 25).

Additionally, the burn chamber 300 may further include a plurality of respective biasing elements (e.g. extension springs) 366 operably coupled to each of the respective plurality of support legs 358, 360, 362 and to the lower portion 312 of the main body 302 of the burn chamber 300 so as to at least bias and hold each of the respective plurality of support legs 358, 360, 362 in place when each of the respective plurality of support legs 358, 360, 362 are pivoted inwardly and proximate to the lower portion 312 of the main body 302 (e.g. as shown in at FIG. 25), especially when the portable outdoor cooker 100 is in the collapsed non-use configuration. Alternatively, as may be understood by one skilled in the art, each of the respective leg-retaining protrusions 350, 352, 354 of the lower portion 312 of the main body 302 of the burn chamber 300 and each of the respective plurality of support legs 358, 360, 362 of the burn chamber 300 may be configured such that each of the respective plurality of support legs 358, 360, 362 may be removably coupled to each of the respective leg-retaining protrusions 350, 352, 354 without the use of fasteners and/or biasing elements, such as by a telescoping fit or a press fit (not shown).

As further shown in at least FIGS. 1-8, 25 and 26, each of the plurality of support legs 358, 360, 362 may be selectively moved (e.g. by the user grasping one or more of the plurality of support legs 358, 360, 362) between (i) a supporting position (e.g. as shown in at least FIGS. 1-8) in which the plurality of support legs 358, 360, 362 are together capable of supporting the main body 302 of the burn chamber 300 in an elevated position in which at least the lowermost surface 356 of the main body 302 is capable of being spaced above a ground surface $G_1$ disposed below the main body 302 and (ii) a non-supporting position (e.g. as shown in at least FIGS. 25 and 26) in which the plurality of support legs 358, 360, 362 are not capable of supporting the main body 302 in the elevated position.

As such, when the plurality of support legs 358, 360, 362 are in the supporting position to support the burn chamber 300 in the elevated position, at least the lower portion 312 of the main body 302 of the burn chamber 300 may be advantageously elevated and held at a distance away from the ground surface $G_1$, especially when solid combustible fuel $F_1$ is burned within the burn chamber 300 and causes at least the main body 302 of the burn chamber 300 to get substantially hot. In this manner, the ground surface $G_1$ disposed below the main body 302 of the burn chamber 300, which may include lawn grass, weeds, leaves, decking, outdoor flooring, etc., may avoid potential burn damage which could be caused by contacting at least the lower portion 312 of the main body 302 of the burn chamber 300 when the main body 302 is substantially hot during use.

Furthermore, when the plurality of support legs 358, 360, 362 are in the supporting position, at least the substantially elongated portion 308 of the main body 302 of the burn chamber 300 is capable of extending in a substantially horizontal direction with respect to at least the ground surface $G_1$ disposed below the main body 302 of the burn chamber 300. As such, the substantially elongated portion 308 of the main body 302 of the burn chamber 300, together with the plurality of support legs 358, 360, 362, may advantageously enable the burn chamber 300 to have a relatively wide stance and a relatively low center of gravity, thus further stabilizing the burn chamber 300 over at least the ground surface $G_1$, especially when the portable outdoor cooker 100 is in the deployed use configuration, as will be further described herein.

Furthermore, as will be further described herein, when the plurality of support legs 358, 360, 362 of the burn chamber 300 are in the non-supporting position, the overall space which the burn chamber 300 occupies may be substantially reduced, which is especially advantageous for handling and/or stowing the burn chamber 300 when not in use, especially when the portable outdoor cooker 100 is in the collapsed non-use configuration, as will be further described herein.

With regard to the overall construction of the burn chamber 300, at least the main body 302 and the plurality of support legs 358, 360, 362 of the burn chamber 300 may be rigid, thus advantageously providing the burn chamber 300 with increased overall, stiffness, strength and stability, especially when the portable outdoor cooker 100 is in the deployed use configuration. As non-limiting examples, the burn chamber 300 may be made from a material, or combination of materials, such as steel, stainless steel, aluminum or any other suitable material, as may be understood by one skilled in the art. Additionally, various manufacturing processes, or combination of manufacturing processes, such as machining, casting, extruding, bending, cutting, welding, riveting or other suitable manufacturing process may be employed to construct the burn chamber 300, as may be understood by one skilled in the art. Furthermore, as non-limiting examples, the outer and/or inner surfaces of the burn chamber 300 may be coated with a protective coating such as a high-temperature powder coating, a high-temperature paint or other suitable coating, as may be understood by one skilled in the art. Furthermore, the burn chamber 300 is preferably shaped and sized such that the entire burn chamber 300 is capable of fitting within the interior space of the cooking chamber 200 when the top hood 216 of the cooking chamber 200 is in the closed position. More specifically, the burn chamber 300 is preferably shaped and sized such that, when the portable outdoor cooker 100 is in the collapsed non-use configuration and each of the plurality of support legs 358, 360, 362 of the burn chamber 300 are in the non-supporting position, at least the entire burn chamber 300 is capable of being stowed within the interior space of the cooking chamber 200 above at least the grates 288, 290 of the cooking chamber 200 and beneath the top hood 216 of the cooking chamber 200 when the top hood 216 is in the closed position (e.g. as shown in FIGS. 26 and 27).

Referring now to at least FIGS. 1-7, 10, 11, 13, 14, 19, 24, 26 and 27, the riser 400 of the portable outdoor cooker 100 is shown in several views. In general, the riser 400 may be capable of removably operably coupling the cooking chamber 200 and the burn chamber 300 to each other such that heat $H_1$ generated from within the burn chamber 300 may rise and flow from the burn chamber 300 upwardly and into the cooking chamber 200, especially when the portable outdoor cooker 100 generates heat $H_1$ for cooking food in the deployed use configuration, as will be further described herein. More specifically, the riser 400 may be substantially elongated and tubular and may have an upper end portion 402, a lower end portion 404 and an elongated main portion 406 extending between at least the upper end portion 402 and the lower end portion 404. As shown in at least FIGS. 10, 11, 13 and 14, the upper end portion 402 of the riser 400 may have an opening 408 formed therein and the lower end portion 404 of the riser 400 may have an opening 410 formed therein. As such, the riser 400 may further have an interior space defined therein between at least the upper end portion 402, the lower end portion 404 and the elongated main portion 406.

Figure 13:
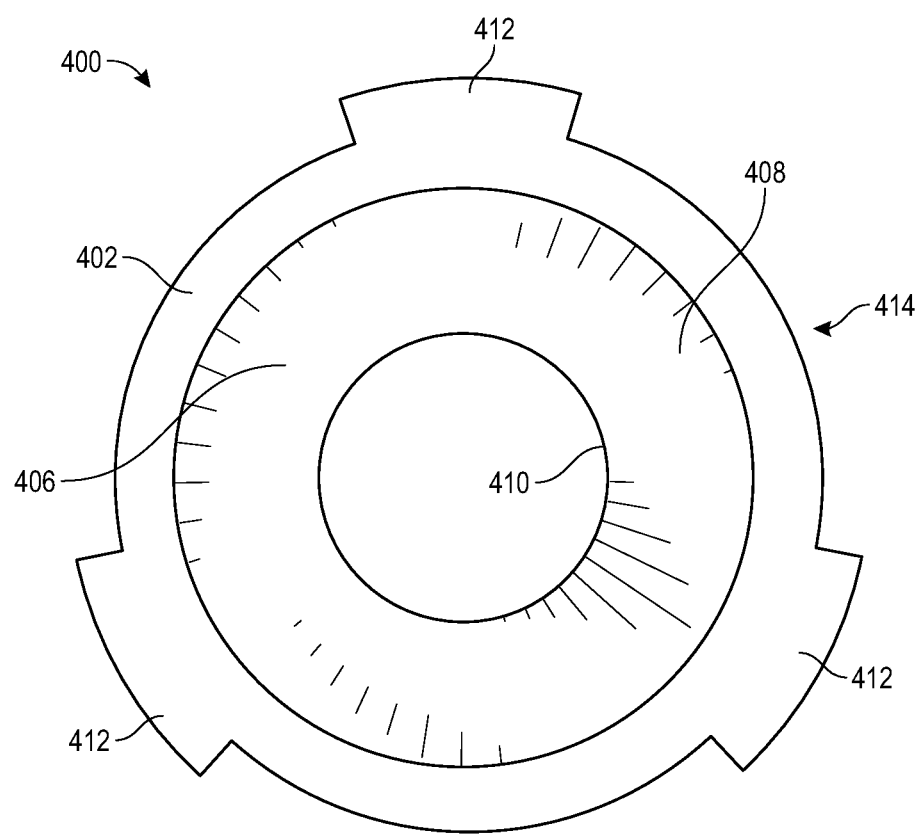
FIG. 13 is a top view of an upper end portion of the riser shown in FIGS. 10 and 11, which further illustrates a second portion of the cooking chamber-riser interlock joint.

As shown in at least FIGS. 13 and 14, the riser 400 may further include a plurality of upper engagement tabs 412 extending at least radially outwardly from the elongated main portion 406 at the upper end portion 402 of the riser 400. The plurality of upper engagement tabs 412, together with the opening 408 formed in the upper end portion 402, may form at least part of a second portion 414 of the cooking chamber-riser interlock joint $A_1$. As such, as may be understood by one skilled in the art, the opening 408 formed in the upper end portion 402 of the riser 400 and the plurality of upper engagement tabs 412 may be shaped and sized according to the particular design and/or configuration of the second portion 414 of the cooking chamber-riser interlock joint $A_1$.

Figure 10:
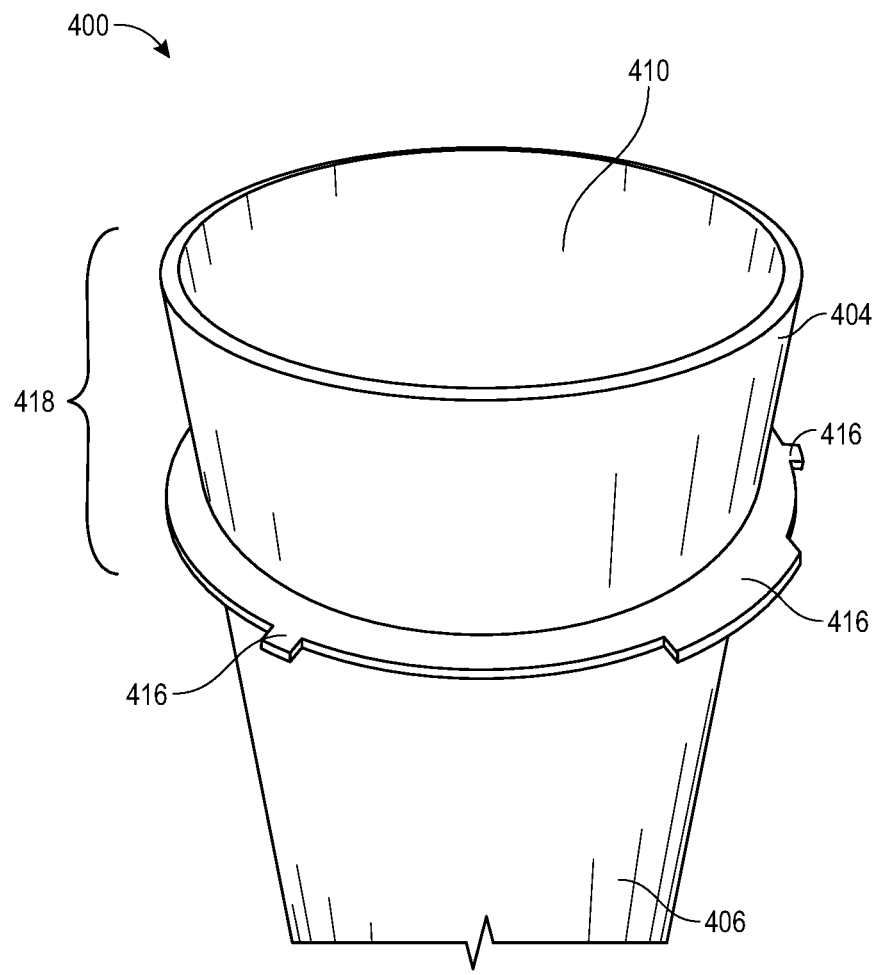
FIG. 10 is a perspective view of a lower end portion of a riser of the portable outdoor cooker, which further illustrates a second portion of the burn chamber-riser interlock joint.
Figure 11:
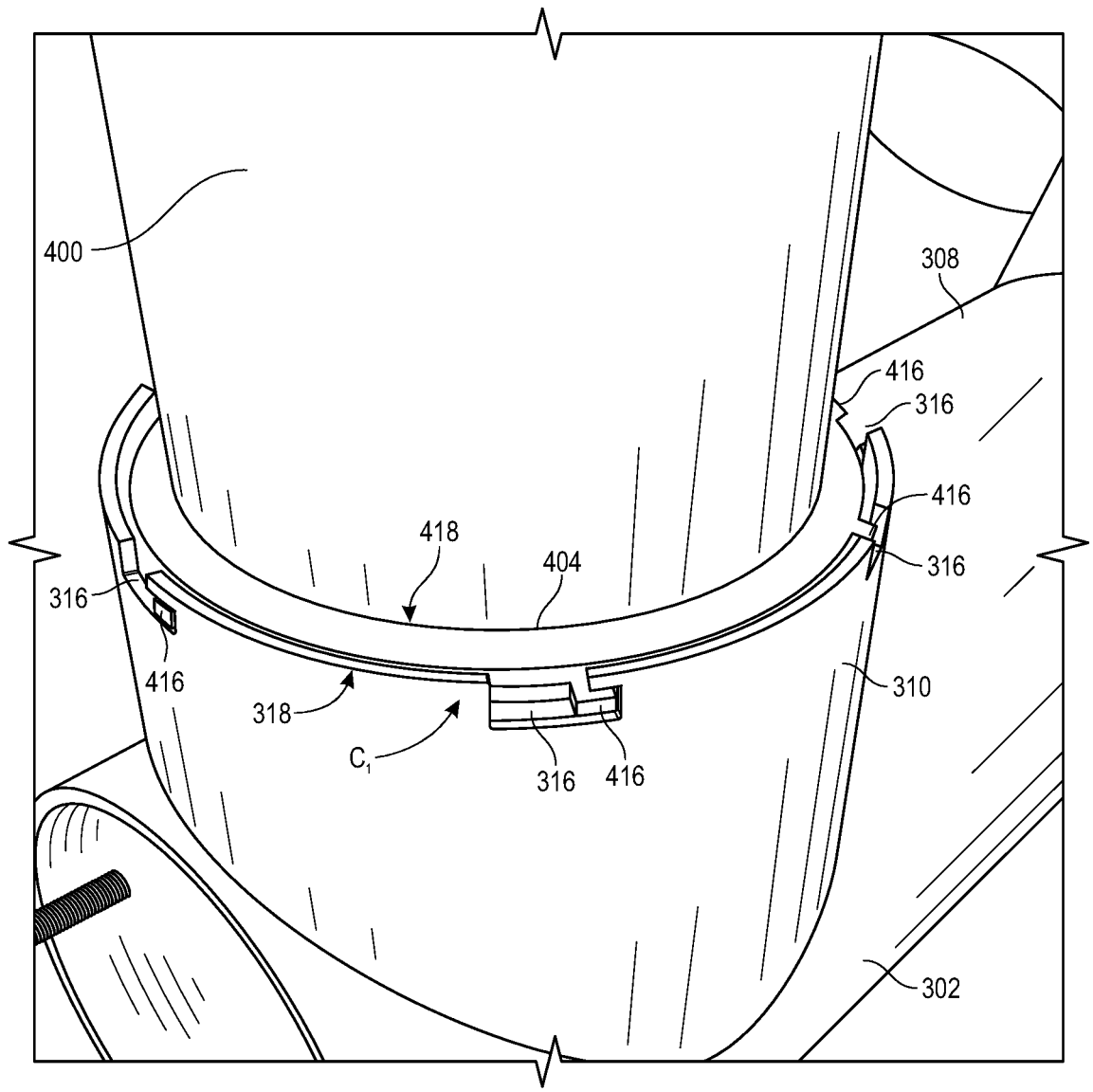
FIG. 11 is a perspective view illustrating the lower end portion of the riser shown in FIG. 10 removably coupled to the burn chamber shown in FIG. 9 at the opening formed in the upper portion of the main body of the burn chamber by way of the burn chamber-riser interlock joint.

As shown in at least FIGS. 10 and 11, the riser 400 may further include a plurality of lower engagement tabs 416 extending at least radially outwardly from the elongated main portion 406 proximate to the lower end portion 404 of the riser 400. The plurality of lower engagement tabs 416, together with the lower end portion 404 of the riser 400 and the opening 410 formed in the lower end portion 404, may form at least part of a second portion 418 of the burn chamber-riser interlock joint $C_1$. As such, as may be understood by one skilled in the art, the opening 410 formed in the lower end portion 404 of the riser 400 and the plurality of lower engagement tabs 416 may be shaped and sized according to the particular design and/or configuration of the second portion 418 of the burn chamber-riser interlock joint $C_1$.

With particular reference to at least FIGS. 9-14, the riser 400 of the portable outdoor cooker 100 may be removably coupled to each of the cooking chamber 200 and the burn chamber 300 such that (i) the upper end portion 402 of the riser 400 may be removably coupled to the cooking chamber 200 at the opening 214 formed in the bottom wall 212 of the cooking chamber 200 (e.g. by the user aligning and inserting the plurality of upper engagement tabs 412 of the second portion 414 of the cooking chamber-riser interlock joint $A_1$ into the bottom wall slot 258 of the first portion 260 of the cooking chamber-riser interlock joint $A_1$ and rotating the riser 400 in a clockwise or counterclockwise direction) and (ii) the lower end portion 404 of the riser 400 may be removably coupled to the burn chamber 300 at the opening 314 formed in the upper portion 310 of the main body 302 of the burn chamber 300 (e.g. by the user aligning and inserting the plurality of lower engagement tabs 416 of the second portion 418 of the burn chamber-riser interlock joint $C_1$ into the respective plurality of notches 316 of the first portion 318 of the burn chamber-riser interlock joint $C_1$ and rotating the riser 400 in a counterclockwise direction). In this manner, the user may advantageously removably couple and decouple the riser 400 to and from each of the cooking chamber 200 and the burn chamber 300 by employing a twist-locking and twist-unlocking operation which is enabled by the use of at least the cooking chamber-riser interlock joint $A_1$ and the burn chamber-riser interlock joint $C_1$, as described herein. As may be understood by one skilled in the art, while the cooking chamber-riser interlock joint $A_1$ and the burn chamber-riser interlock joint $C_1$ are described and shown herein, other suitable joints and/or connections may be employed to removably couple and decouple the riser 400 to and from each of the cooking chamber 200 and the burn chamber 300.

With regard to the overall construction of the riser 400, the riser 400 may be rigid, thus advantageously providing the riser 400 with increased overall, stiffness, strength and stability, especially when the portable outdoor cooker 100 is in the deployed use configuration. As non-limiting examples, the riser 400 may be made from a material, or combination of materials, such as steel, stainless steel, aluminum or any other suitable material, as may be understood by one skilled in the art. Additionally, various manufacturing processes, or combination of manufacturing processes, such as machining, casting, extruding, bending, cutting, welding, riveting or other suitable manufacturing process may be employed to construct the riser 400, as may be understood by one skilled in the art. Furthermore, as non-limiting examples, the outer and/or inner surfaces of the riser 400 may be coated with a protective coating such as a high-temperature powder coating, a high-temperature paint or other suitable coating, as may be understood by one skilled in the art. Furthermore, the riser 400 is preferably shaped and sized such that the entire riser 400 is capable of fitting within the interior space of the cooking chamber 200 when the top hood 216 of the cooking chamber 200 is in the closed position. More specifically, the riser 400 is preferably shaped and sized such that, when the portable outdoor cooker 100 is in the collapsed non-use configuration and each of the plurality of support legs 358, 360, 362 of the burn chamber 300 are in the non-supporting position, and the riser 400 is decoupled from the cooking chamber 200 and the burn chamber 300, at least the entire burn chamber 300 and the entire riser 400 are capable of being stowed together within the interior space of the cooking chamber 200 above at least the grates 288, 290 of the cooking chamber 200 and beneath the top hood 216 of the cooking chamber 200 when the top hood 216 is in the closed position (e.g. as shown in FIGS. 26 and 27).

Referring now to at least FIGS. 1-7, 15-17, 24, 26 and 27, the chimney 500 of the portable outdoor cooker 100 is shown in several views. The chimney 500 may be substantially elongated and tubular and may have an upper end portion 502, a lower end portion 504 and an elongated main portion 506 extending between at least the upper end portion 502 and the lower end portion 504. As shown in at least FIGS. 1 and 15-17, the upper end portion 502 of the chimney 500 may have an opening 508 formed therein and the lower end portion 504 of the chimney 500 may have an opening 510 formed therein. As such, the chimney 500 may further have an interior space defined therein between at least the upper end portion 502, the lower end portion 504 and the elongated main portion 506.

Figure 16:
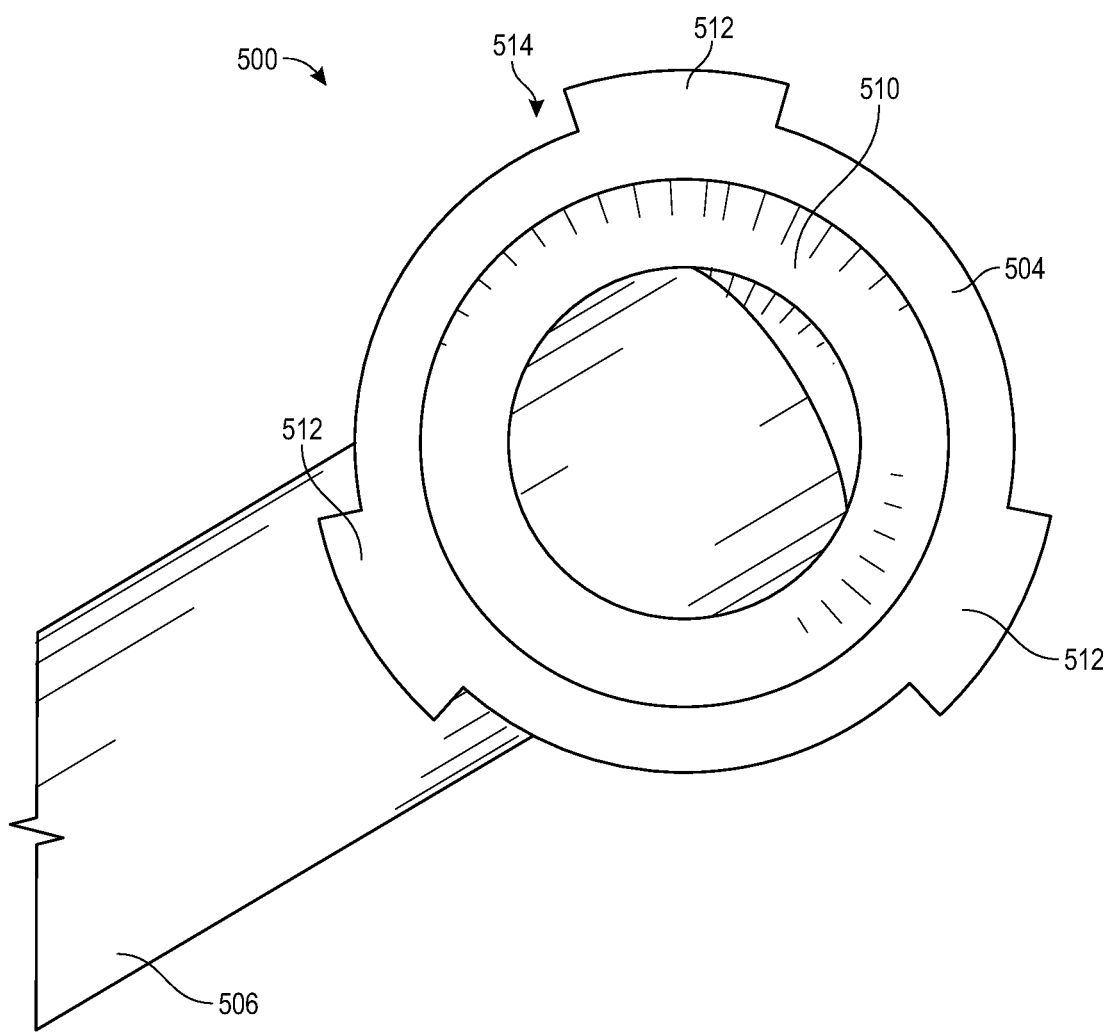
FIG. 16 is a side view of the lower end portion of the chimney shown in FIG. 15, which further illustrates the second portion of the cooking chamber-chimney interlock joint.

As shown in at least FIGS. 15 and 16, the chimney 500 may further include a plurality of engagement tabs 512 extending at least radially outwardly from the chimney 500 at the lower end portion 504 of the chimney 500. The plurality of engagement tabs 512, together with the opening 510 formed in the lower end portion 504 of the chimney 500, may form at least part of a second portion 514 of the cooking chamber-chimney interlock joint $B_1$. As such, as may be understood by one skilled in the art, the opening 510 formed in the lower end portion 504 of the chimney 500 and the plurality of engagement tabs 512 may be shaped and sized according to the particular design and/or configuration of the second portion 514 of the cooking chamber-chimney interlock joint $B_1$.

With reference to at least FIGS. 1, 15 and 16, the chimney 500 may be removably coupled to the cooking chamber 200 at the opening 210 formed in the side wall 202 of the cooking chamber 200 (e.g. by the user aligning and inserting the plurality of engagement tabs 512 of the second portion 514 of the cooking chamber-chimney interlock joint $B_1$ into the side wall slot 266 of the first portion 268 of the cooking chamber-chimney interlock joint $B_1$ and rotating the chimney 500 in a counterclockwise direction). In this manner, the user may advantageously removably couple and decouple the chimney 500 to and from the cooking chamber 200 by employing a twist-locking and twist-unlocking operation which is enabled by the use of at least the cooking chamber-chimney interlock joint $B_1$, as described herein. As may be understood by one skilled in the art, while the cooking chamber-chimney interlock joint $B_1$ is described and shown herein, other suitable joints and/or connections may be employed to removably couple and decouple the chimney 500 to and from the cooking chamber 200.

As schematically shown in FIG. 24, when the chimney 500 is removably coupled to the cooking chamber 200, the chimney 500 is capable of facilitating the exit of exhaust flow of exhaust $E_1$ from at least the cooking chamber 200, which may be a combination of hot air, gases from the cooked food, smoke generated in the burn chamber 300 and/or cooking chamber 200, etc., as may be understood by one skilled in the art, and as will be further described herein.

Figure 17:
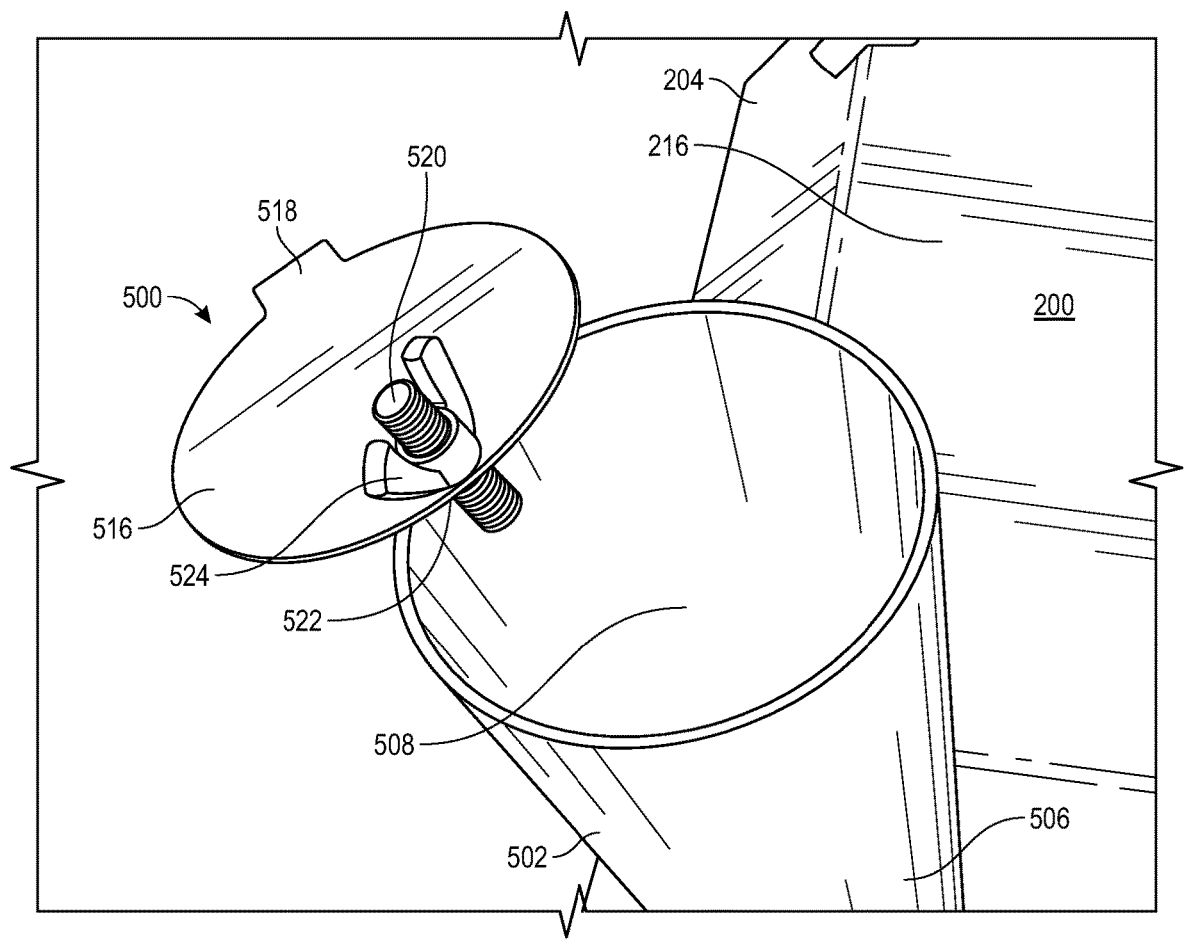
FIG. 17 is a perspective view of an upper end portion of the chimney shown in FIGS. 15 and 16, which further illustrates a damper plate of the chimney secured in an open position.
Figure 18:
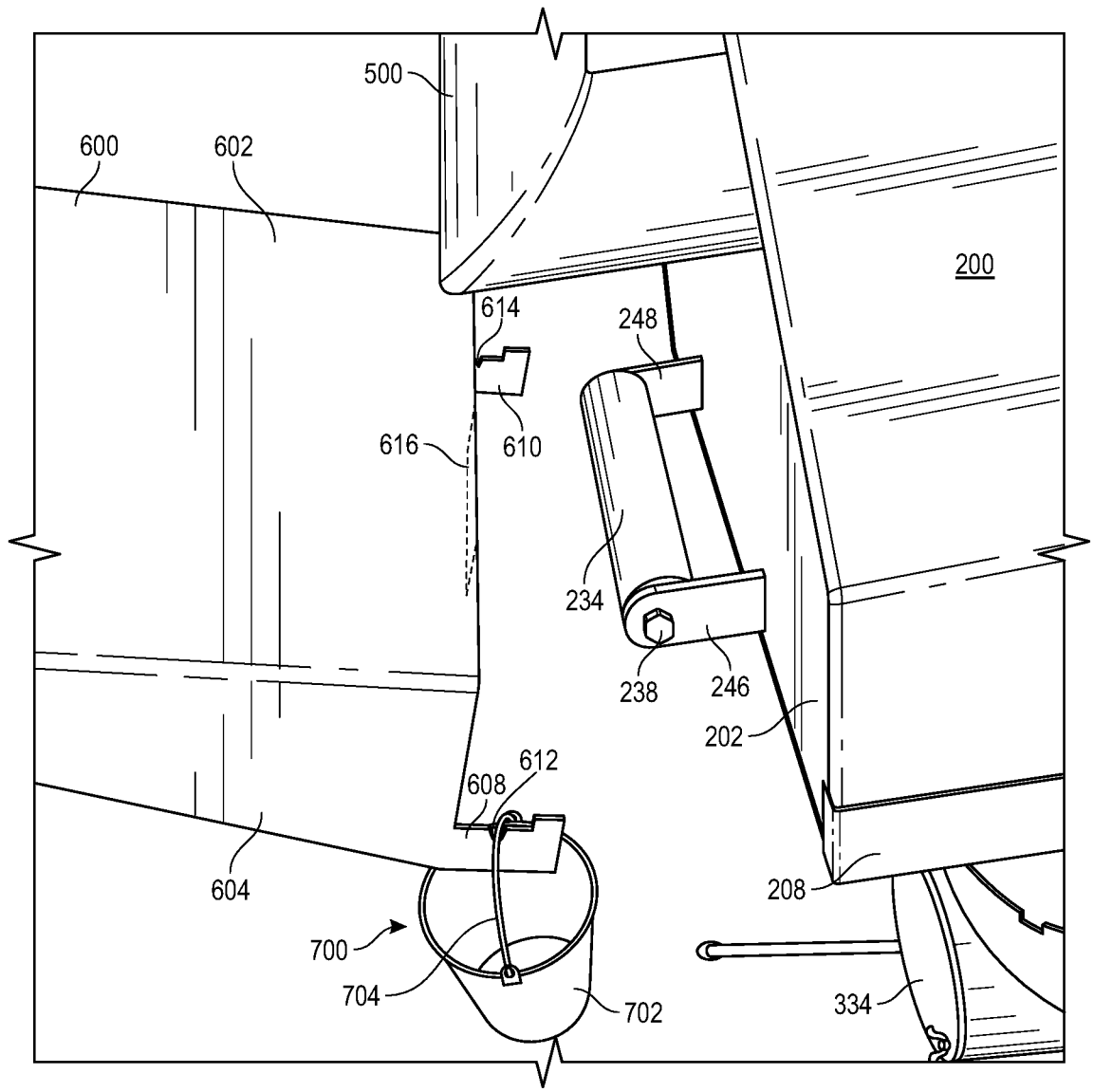
FIG. 18 is a perspective view illustrating a drip receptacle of the portable outdoor cooker removably coupled to a shelf of the portable outdoor cooker before the shelf is removably coupled to the cooking chamber.

As shown particularly in FIG. 17, the chimney 500 may further include a damper plate 516. The damper plate 516 may include a handle portion 518 extending therefrom. The damper plate 516 may be movably coupled (e.g. pivotally coupled) to the upper end portion 502 of the chimney 500. As a non-limiting example, a threaded rod 520 may be fixed (e.g. by welding) to an inner surface of the upper end portion 502 of the chimney 500. The threaded rod 520 may be capable of extending through a hole 522 formed in the damper plate 516 of the chimney 500. As such, the damper plate 516 may be movably coupled to the upper end portion 502 of the chimney 500 by aligning the hole 522 formed in the damper plate 516 with the threaded rod 520, inserting the threaded rod 520 through the hole 522 formed in the damper plate 516, and at least partially tightening a wing nut 524 onto the threaded rod 520. When the damper plate 516 is movably coupled to the upper end portion 502 of the chimney 500, the damper plate 516 may therefore be disposed adjacent to, and may partially or fully cover, the opening 508 formed in the upper end portion 502 of the chimney 500. As such, with the wing nut 524 partially tightened, the damper plate 516 may be selectively moved (e.g. pivoted about the threaded rod 520 by the user grasping the handle portion 518) between a plurality of positions with respect to the opening 508 formed in the upper end portion 502 of the chimney 500.

More specifically, the damper plate 516 of the chimney 500 may be selectively moved and then secured (e.g. by the user fully tightening the wing nut 524 onto the threaded rod 520) into various open positions so as to adjust an amount of exhaust flow of exhaust $E_1$ to be let out of the chimney 500 (i.e. through the opening 508) and thus out from at least the interior space of the cooking chamber 200, as schematically shown in FIG. 24. As such, when the portable outdoor cooker 100 is in the deployed use configuration and solid combustible fuel $F_1$ is loaded, ignited and burned within the burn chamber 300 to generate heat $H_1$ for cooking food, the intensity of the flame generating the heat $H_1$ provided from the burn chamber 300 to the cooking chamber 200 (e.g. as schematically shown in FIG. 24), may be further advantageously adjusted (i.e. depending on an amount of exhaust flow of exhaust $E_1$ let out of the chimney 500), which may further adjust at least a cooking temperature within the cooking chamber 200. In this manner, when solid combustible fuel $F_1$ is loaded, ignited and burned within the interior space of the main body 302 of the burn chamber 300 to generate heat $H_1$ for cooking food in the cooking chamber 200, a greater amount of exhaust flow let out of the chimney 500 (i.e. by adjusting the position of the damper plate 516 with respect to the opening 508) may ultimately act to pull more air flow into the burn chamber 300 (i.e. through the first access opening 320 from outside of the main body 302) and thus result in the flame intensity to be greater, thus generating a greater amount of heat $H_1$. Alternatively, a lesser amount of exhaust flow let out of the chimney 500 (i.e. by adjusting the position of the damper plate 516 with respect to the opening 508) may result in the flame intensity to be lesser (i.e. causing less air flow to be pulled into the burn chamber 300), thus generating a lesser amount of heat $H_1$ provided to the cooking chamber 200 from the burn chamber 300. Furthermore, a lesser amount of exhaust flow let out of the chimney 500 (i.e. by adjusting the position of the damper plate 516 with respect to the opening 508) may advantageously produce a more smoked or smoky flavor for the cooked food since more smoke is held within the cooking chamber 200 as a result. In this manner, the user may therefore advantageously have the capability to further adjust at least a cooking temperature within the cooking chamber 200, and a desired level of smoke flavor for the cooked food, based on at least the selected position of the damper plate 516 of the chimney 500 with respect to the opening 508, in combination with at least the selected position of the damper plate 324 of the burn chamber 300 with respect to the first access opening 320, as may be understood by one skilled in the art. As may also be understood by one skilled in the art, the damper plate 516 of the chimney 500 may be selectively moved and then secured (e.g. by the user fully tightening the wing nut 524 onto the threaded rod 520) into a fully closed position with respect to the opening 508, such as when the portable outdoor cooker 100 is in the deployed use configuration but is not yet loaded and/or ignited for cooking food (e.g. as shown in FIGS. 1-7), or when the portable outdoor cooker 100 is in the collapsed non-use configuration (e.g. as shown in FIGS. 26 and 27).

With regard to the overall construction of the chimney 500, the chimney 500 may be rigid, thus advantageously providing the chimney 500 with increased overall, stiffness, strength and stability, especially when the portable outdoor cooker 100 is in the deployed use configuration. As non-limiting examples, the chimney 500 may be made from a material, or combination of materials, such as steel, stainless steel, aluminum or any other suitable material, as may be understood by one skilled in the art. Additionally, various manufacturing processes, or combination of manufacturing processes, such as machining, casting, extruding, bending, cutting, welding, riveting or other suitable manufacturing process may be employed to construct the chimney 500, as may be understood by one skilled in the art. Furthermore, as non-limiting examples, the outer and/or inner surfaces of the chimney 500 may be coated with a protective coating such as a high-temperature powder coating, a high-temperature paint or other suitable coating, as may be understood by one skilled in the art. Furthermore, the chimney 500 is preferably shaped and sized such that the entire chimney 500 is capable of fitting within the interior space of the cooking chamber 200 when the top hood 216 of the cooking chamber 200 is in the closed position. More specifically, the chimney 500 is preferably shaped and sized such that, when the portable outdoor cooker 100 is in the collapsed non-use configuration, and each of the plurality of support legs 358, 360, 362 of the burn chamber 300 are in the non-supporting position, and the riser 400 is decoupled from the cooking chamber 200 and the burn chamber 300, and the chimney 500 is decoupled from the cooking chamber 200, at least the entire burn chamber 300, the entire riser 400 and the entire chimney 500 are capable of being stowed together within the interior space of the cooking chamber 200 above at least the grates 288, 290 of the cooking chamber 200 and beneath the top hood 216 of the cooking chamber 200 when the top hood 216 is in the closed position (e.g. as shown in FIGS. 26 and 27).

Referring now to at least FIGS. 1, 2, 18-20, 26 and 27, the shelf 600 of the portable outdoor cooker 100 is shown in several views. The shelf 600 may include a supporting portion 602 which may be generally planar so as to be capable of supporting various items such as food, cooking utensils, etc. thereon. The shelf 600 may further include respective side walls 604, 606 which may extend generally downwardly from the supporting portion 602 of the shelf 600. Each of the respective side walls 604, 606 may further include respective cooking chamber-engagement arms 608, 610 extending therefrom. Each of the cooking chamber-engagement arms 608, 610 may further include respective drip receptacle-engagement notches 612, 614 formed therein which are each capable of receiving and engaging at least part of the drip receptacle 700 (i.e. one at a given time) such that the drip receptacle 700 may be removably coupled to the shelf 600 by way of either of the drip receptacle-engagement notches 612, 614 (i.e. depending on the specific location of the drip outlet 276 formed in the cooking chamber 200), as will be further described herein. As shown in at least FIGS. 19 and 20, the shelf 600 may further include a carrying handle-engagement tab 616. The carrying handle-engagement tab 616 may be disposed generally between the side walls 604, 606 of the shelf 600 and may extend generally downwardly from the supporting portion 602 of the shelf 600. As a non-limiting example, the shelf 600 may be removably coupled to at least a carrying handle, such as carrying handle 234, from the plurality of carrying handles 234, 236 which are operably coupled to the cooking chamber 200. More specifically, as further shown in FIGS. 19 and 20, each of the cooking chamber-engagement arms 608, 610 of the shelf 600 may engage the bottom wall 212 of the cooking chamber 200 (i.e. exerting an upward force on the bottom wall 212) while the carrying handle-engagement tab 616 of the shelf 600 may engage a portion of the carrying handle 234 such that the supporting portion 602 of the shelf 600 may securely rest on the carrying handle 234 (i.e. such that the shelf 600 exerts a downward force on the carrying handle 234). As such, with the configuration as described, the shelf 600 may be advantageously removably coupled to and decoupled from the cooking chamber 200. While one shelf 600 is shown and described, it may be understood by one skilled in the art that two shelves may be employed so as to each be removably coupled to the cooking chamber 200 by way of at least the opposing carrying handles 234, 236. Furthermore, it is to be understood that the use of the shelf 600 is optional, and thus the shelf 600 may or may not be employed by the user at a given time, especially when the portable outdoor cooker 100 is in the deployed use configuration, as will be further described herein.

With regard to the overall construction of the shelf 600, the shelf 600 may be rigid, thus advantageously providing the shelf 600 with increased overall, stiffness, strength and stability, especially when the portable outdoor cooker 100 is in the deployed use configuration. As non-limiting examples, the shelf 600 may be made from a material, or combination of materials, such as steel, stainless steel, aluminum or any other suitable material, as may be understood by one skilled in the art. Additionally, various manufacturing processes, or combination of manufacturing processes, such as machining, casting, extruding, bending, cutting, welding, riveting or other suitable manufacturing process may be employed to construct the shelf 600, as may be understood by one skilled in the art. Furthermore, as non-limiting examples, the outer surfaces of the shelf 600 may be coated with a protective coating such as a high-temperature powder coating, a paint, a high-temperature paint or other suitable coating, as may be understood by one skilled in the art. Furthermore, the shelf 600 is preferably shaped and sized such that the entire shelf 600 is capable of fitting within the interior space of the cooking chamber 200 when the top hood 216 of the cooking chamber 200 is in the closed position. More specifically, the shelf 600 is preferably shaped and sized such that, when the portable outdoor cooker 100 is in the collapsed non-use configuration, and each of the plurality of support legs 358, 360, 362 of the burn chamber 300 are in the non-supporting position, and the riser 400 is decoupled from the cooking chamber 200 and the burn chamber 300, and the chimney 500 is decoupled from the cooking chamber 200, and the shelf 600 is decoupled from the cooking chamber 200, at least the entire burn chamber 300, the entire riser 400, the entire chimney 500 and the entire shelf 600 are capable of being stowed together within the interior space of the cooking chamber 200 above at least the grates 288, 290 of the cooking chamber 200 and beneath the top hood 216 of the cooking chamber 200 when the top hood 216 is in the closed position (e.g. as shown in FIGS. 26 and 27).

Figure 20:
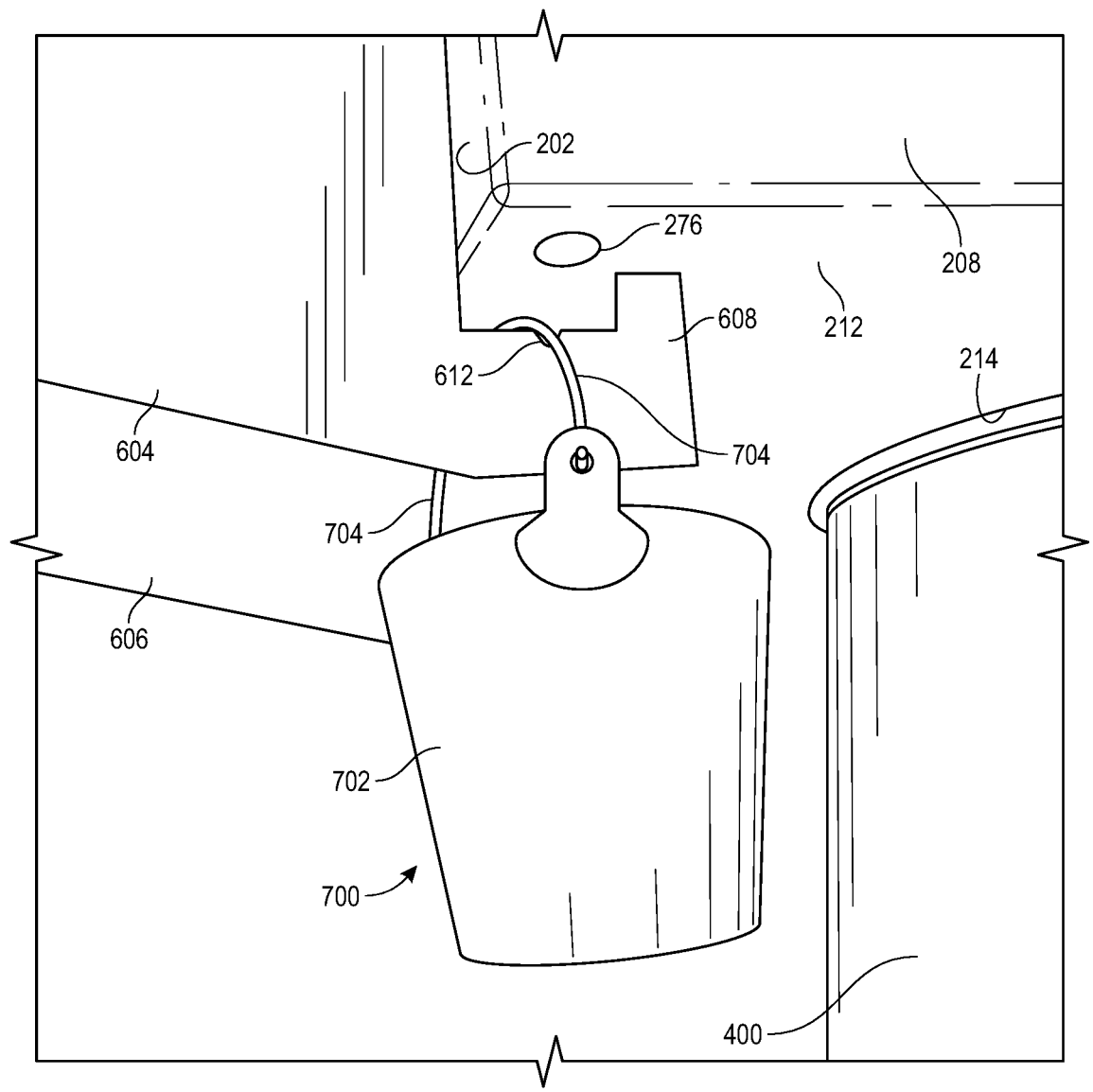
FIG. 20 is a perspective view illustrating the drip receptacle removably coupled to the shelf and disposed beneath a drip outlet formed in the cooking chamber.

Still referring to at least FIGS. 1, 2, 18-20, 26 and 27, the drip receptacle 700 of the portable outdoor cooker 100 is shown in several views. The drip receptacle 700 may include a cup portion 702 and a handle portion 704 pivotally coupled to the cup portion 702. As shown in FIGS. 19 and 20, the handle portion 704 of the drip receptacle 700 may be received in one of the drip receptacle-engagement notches 612, 614 formed in the shelf 600, as previously described herein. In this manner, the drip receptacle 700 may therefore be advantageously removably coupled to and decoupled from the shelf 600. As shown in FIG. 20, when the drip receptacle is removably coupled to the shelf 600, the drip receptacle 700 may be generally aligned with and disposed beneath the drip outlet 276 formed in the cooking chamber 200 and may therefore collect any juice and/or grease which may flow out of the drip outlet 276, especially when the portable outdoor cooker 100 generates heat $H_1$ and cooks food, such as in the deployed use configuration. Furthermore, it is to be understood that the use of the drip receptacle 700 is optional, and thus the drip receptacle 700 may or may not be employed by the user at a given time, especially when the portable outdoor cooker 100 is in the deployed use configuration, as will be further described herein.

With regard to the overall construction of the drip receptacle 700, as non-limiting examples, the drip receptacle 700 may be made from a material, or combination of materials, such as steel, stainless steel, aluminum, plastic, a composite material or any other suitable material, as may be understood by one skilled in the art. Additionally, various manufacturing processes, or combination of manufacturing processes, such as machining, casting, extruding, bending, cutting, welding, riveting, injection molding or other suitable manufacturing process may be employed to construct the drip receptacle 700, as may be understood by one skilled in the art. Furthermore, as non-limiting examples, the outer and/or inner surfaces of the drip receptacle 700 may be coated with a protective coating such as a high-temperature powder coating, a paint, a high-temperature paint or other suitable coating, as may be understood by one skilled in the art. Furthermore, the drip receptacle 700 is preferably shaped and sized such that the entire drip receptacle 700 is capable of fitting within the interior space of the cooking chamber 200 when the top hood 216 of the cooking chamber 200 is in the closed position. More specifically, the drip receptacle 700 is preferably shaped and sized such that, when the portable outdoor cooker 100 is in the collapsed non-use configuration, and each of the plurality of support legs 358, 360, 362 of the burn chamber 300 are in the non-supporting position, and the riser 400 is decoupled from the cooking chamber 200 and the burn chamber 300, and the chimney 500 is decoupled from the cooking chamber 200, and the shelf 600 is decoupled from the cooking chamber 200, and the drip receptacle 700 is decoupled from the shelf 600, at least the entire burn chamber 300, the entire riser 400, the entire chimney 500, the entire shelf 600 and the entire drip receptacle 700 are capable of being stowed together within the interior space of the cooking chamber 200 above at least the grates 288, 290 of the cooking chamber 200 and beneath the top hood 216 of the cooking chamber 200 when the top hood 216 is in the closed position (e.g. as shown in FIGS. 26 and 27).

As previously mentioned in several instances throughout the present disclosure, the portable outdoor cooker 100 may be selectively transitioned (e.g. by the user selectively removably coupling and decoupling various components of the portable outdoor cooker 100 to and from each other, as previously described herein) between at least (i) a deployed use configuration (e.g. shown in at least FIGS. 1-7 and 24) in which the portable outdoor cooker 100 is capable of at least cooking food and (ii) a collapsed non-use configuration (e.g. shown in at least FIGS. 26 and 27) in which the portable outdoor cooker 100 is capable of at least being transported and/or stored.

With regard to the deployed use configuration of the portable outdoor cooker 100, when the portable outdoor cooker 100 is in the deployed use configuration: (i) each of the plurality of support legs 358, 360, 362 of the burn chamber 300 are in the supporting position, (ii) the riser 400 is removably coupled to each of the cooking chamber 200 and the burn chamber 300 such that (a) the upper end portion 402 of the riser 400 is removably coupled to the cooking chamber 200 at the opening 214 formed in the bottom wall 212 of the cooking chamber 200 and (b) the lower end portion 404 of the riser 400 is removably coupled to the burn chamber 300 at the opening 314 formed in the upper portion 310 of the main body 302 of the burn chamber 300, (iii) the burn chamber 300 is capable of receiving and housing solid combustible fuel $F_1$ within the interior space of the burn chamber 300 such that, when solid combustible fuel $F_1$ is placed within the interior space of the burn chamber 300, the solid combustible fuel $F_1$ is capable of being burned within the interior space of the burn chamber 300 to provide heat $H_1$ to the cooking chamber 200 by way of the riser 400, (iv) the chimney 500 is removably coupled to the cooking chamber 200 at the opening 210 formed in the side wall 202 of the cooking chamber 200, (v) the shelf 600 is removably coupled to the cooking chamber 200, (vi) the drip receptacle 700 is removably coupled to the shelf 600, and (vii) the cooking chamber 200 is capable of receiving and housing food within the interior space of the cooking chamber 200 such that, when food is placed within the interior space of the cooking chamber 200 (e.g. such as on the grates 288, 290), the food is capable of being cooked within the interior space of the cooking chamber 200.

Furthermore, when the portable outdoor cooker 100 is in the deployed use configuration: (viii) the substantially elongated portion 308 of the main body 302 of the burn chamber 300 is capable of extending in a substantially horizontal direction with respect to at least the ground surface $G_1$ disposed below the main body 302 of the burn chamber 300, (ix) the riser 400 extends in a substantially vertical direction with respect to at least the substantially elongated portion 308 of the main body 302 of the burn chamber 300, (x) the riser 400 is load-bearing such that the riser 400 supports the weight of at least the cooking chamber 200, (xi) the main body 302 of the burn chamber 300 is load-bearing such that the main body 302 supports the combined weight of at least the cooking chamber 200 and the riser 400, and (xii) each of the plurality of support legs 358, 360, 362 of the burn chamber 300 are load-bearing such that the plurality of support legs 358, 360, 362 together support the combined weight of at least the cooking chamber 200, the riser 400 and the main body 302 of the burn chamber 300.

With regard to the collapsed non-use configuration of the portable outdoor cooker 100, when the portable outdoor cooker 100 is in the collapsed non-use configuration: (i) the riser 400 is decoupled from each of the cooking chamber 200 and the burn chamber 300 such that (a) the upper end portion 402 of the riser 400 is decoupled from the cooking chamber 200 and (b) the lower end portion 404 of the riser 400 is decoupled from the burn chamber 300, (ii) each of the plurality of support legs 358, 360, 362 of the burn chamber 300 are in the non-supporting position, (iii) the chimney 500 is decoupled from the cooking chamber 200, (iv) the shelf 600 is decoupled from the cooking chamber 200, (v) the drip receptacle 700 is decoupled from the shelf 600, and (vi) the cooking chamber 200 is capable of receiving and housing the entire burn chamber 300, the entire riser 400, the entire chimney 500, the entire shelf 600 and the entire drip receptacle 700 within the interior space of the cooking chamber 200 such that, when the entire burn chamber 300, the entire riser 400, the entire chimney 500, the entire shelf 600 and the entire drip receptacle 700 are each placed within the interior space of the cooking chamber 200 and the top hood 216 of the cooking chamber 200 is in the closed position, the entire burn chamber 300, the entire riser 400, the entire chimney 500, the entire shelf 600 and the entire drip receptacle 700 are capable of being stowed together within the interior space of the cooking chamber 200 above at least the grates 288, 290 of the cooking chamber 200 and beneath the top hood 216.

With further regard to the above-described deployed use configuration and collapsed non-use configuration of the portable outdoor cooker 100, it is to be understood that, based on preferences of the user, etc., the particular employment of such components as the shelf 600 and/or the drip receptacle 700 of the portable outdoor cooker 100 is optional at any given time during use and/or non-use of the portable outdoor cooker 100. As such, as may be understood by one skilled in the art, in the case where the shelf 600 and/or the drip receptacle 700 are not employed, the above-described deployed use configuration and/or collapsed non-use configuration of the portable outdoor cooker 100 may still be as generally described, with the exception of the shelf 600 and/or drip receptacle 700 being omitted from the above-described deployed use configuration and/or collapsed non-use configuration of the portable outdoor cooker 100.

The exemplary portable outdoor cooker 100 therefore provides several advantages, as generally described herein, and further addresses the need for an outdoor cooker which is at least portable (e.g. by way of at least the portable outdoor cooker 100 being in the collapsed non-use configuration), which is relatively convenient to handle, transport, set up, use and store (e.g. by way of the various components of the portable outdoor cooker 100 which may be quickly removably coupled to and decoupled from each other without the need for certain tools, etc.), which is capable of burning fuels which are typically readily available, plentiful and/or inexpensive (e.g. by way of the burn chamber 300 being capable of burning solid combustible fuel $F_1$ therein such as various types of wood—as described herein), and which is capable of cooking various types of food at various controlled temperatures (e.g. by way of adjusting open positions of the respective damper plates 324, 516 of the respective cooking chamber 300 and chimney 500) so as to be capable of producing a wide range of desired cooking results (e.g. such as cooking various food within the cooking chamber 200 to be well-done, medium, medium-rare, rare, smoked flavored, etc.).

While one or more exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

With regard to any processes, systems, methods, heuristics, etc., described herein, it should be understood that, although the steps of such processes, etc., have been described as occurring according to a certain ordered sequence, such processes could be practiced with the described steps performed in an order other than the order described herein. It should be further understood that certain steps could be performed simultaneously, that other steps could be added, or that certain steps described herein could be omitted. In other words, the descriptions of processes described above are provided for the purpose of illustrating certain embodiments, and should in no way be construed so as to limit the claims.

As used in this specification and claims, the terms "for example"/("e.g."), "for instance", "such as", and "like", and the verbs "comprising", "having", "including", and their other verb forms, when used in conjunction with a listing of one or more carriers or other items, are each to be construed as open-ended, meaning that the listing is not to be considered as excluding other, additional carriers or items. Other terms are to be construed using their broadest reasonable meaning unless they are used in a context that requires a different interpretation.

What is claimed is:

1. A portable outdoor cooker comprising:
a cooking chamber including one or more side walls and a bottom wall connected to and extending between the one or more side walls, the bottom wall having an opening formed therein, the cooking chamber further including a top hood configured to be movable with respect to the one or more side walls and the bottom wall, the top hood being further configured to be selectively moved between an open position and a closed position; and
a burn chamber including a main body having a first end portion, a second end portion and an intermediate portion extending between at least the first and second end portions, the main body further having an upper portion and a lower portion, the upper portion of the main body having an opening formed therein, the intermediate portion of the main body having at least a top surface disposed adjacent to the opening formed in the upper portion of the main body, the lower portion of the main body having a lowermost surface of the main body, the burn chamber further including a plurality of support legs configured to be movable with respect to the main body, the plurality of support legs being further configured to be selectively moved between (i) a supporting position in which the plurality of support legs are together capable of supporting the main body in an elevated position in which at least the lowermost surface of the main body is capable of being spaced above a ground surface disposed below the main body and (ii) a non-supporting position in which the plurality of support legs are not capable of supporting the main body in the elevated position;
wherein the cooking chamber and the burn chamber are each configured to be removably operably coupled to each other;
wherein the portable outdoor cooker is configured to be selectively transitioned between (i) a deployed use configuration in which the portable outdoor cooker is capable of at least cooking food and (ii) a collapsed non-use configuration in which the portable outdoor cooker is capable of at least being transported and/or stored;
wherein when the portable outdoor cooker is in the deployed use configuration:
(i) each of the plurality of support legs of the burn chamber are in the supporting position,
(ii) the cooking chamber and the burn chamber are removably operably coupled to each other,
(iii) the bottom wall of the cooking chamber is spaced above the top surface of the intermediate portion of the main body of the burn chamber such that the bottom wall of the cooking chamber does not contact the top surface of the intermediate portion of the main body of the burn chamber,
(iv) the burn chamber is capable of receiving and housing solid combustible fuel therein such that, when solid combustible fuel is placed within the burn chamber, the solid combustible fuel is capable of being burned within the burn chamber to provide heat to the cooking chamber by way of at least the opening formed in the upper portion of the main body of the burn chamber and the opening formed in the bottom wall of the cooking chamber, and
(v) the cooking chamber is capable of receiving and housing food therein such that, when food is placed within the cooking chamber, the food is capable of being cooked within the cooking chamber; and
wherein when the portable outdoor cooker is in the collapsed non-use configuration:
(i) the cooking chamber and the burn chamber are decoupled from each other,
(ii) each of the plurality of support legs of the burn chamber are in the non-supporting position, and
(iii) the cooking chamber is capable of receiving and housing the entire burn chamber therein such that, when the entire burn chamber is placed within the cooking chamber and the top hood of the cooking chamber is in the closed position, the entire burn chamber is capable of being stowed within the cooking chamber beneath the top hood and above the bottom wall of the cooking chamber.

2. The portable outdoor cooker according to claim 1, wherein at least one of the first and second end portions of the main body of the burn chamber has an access opening formed therein, wherein the access opening permits access into an interior space of the main body to permit at least the solid combustible fuel to be loaded into the interior space of the main body and/or to permit at least cleaning out the interior space of the main body.

3. The portable outdoor cooker according to claim 2, wherein the burn chamber further includes a damper plate configured to be movably coupled to the main body of the burn chamber such that the damper plate is disposed adjacent to the access opening, the damper plate being further configured to be selectively moved between a plurality of positions with respect to the access opening to adjust an amount of air flow to be let into the interior space of the main body from outside of the main body.

4. A portable outdoor cooker comprising:
a cooking chamber including at least one side wall and a bottom wall connected to the at least one side wall, the bottom wall having an opening formed therein, the cooking chamber further including a top hood including a lift handle operably coupled thereto, the top hood being configured to be movable with respect to the at least one side wall and the bottom wall, the top hood being further configured to be selectively moved between an open position and a closed position, wherein with the top hood in the closed position, an interior space of the cooking chamber is defined therein between at least the at least one side wall, the bottom wall and the top hood;
a burn chamber including a main body having a first end portion, a second end portion, an upper portion and a lower portion, the upper portion of the main body having an opening formed therein, the lower portion of the main body having a lowermost surface of the main body, the main body further having an interior space defined therein, the burn chamber further including a plurality of support legs configured to be movable with respect to the main body, the plurality of support legs being further configured to be selectively moved between (i) a supporting position in which the plurality of support legs are together capable of supporting the main body in an elevated position in which at least the lowermost surface of the main body is capable of being spaced above a ground surface disposed below the main body and (ii) a non-supporting position in which the plurality of support legs are not capable of supporting the main body in the elevated position; and
a riser having an upper end portion and a lower end portion;
wherein the riser is configured to be removably coupled to each of the cooking chamber and the burn chamber such that (i) the upper end portion of the riser is configured to be removably coupled to the cooking chamber at the opening formed in the bottom wall of the cooking chamber and (ii) the lower end portion of the riser is configured to be removably coupled to the burn chamber at the opening formed in the upper portion of the main body of the burn chamber; and
wherein the portable outdoor cooker is configured to be selectively transitioned between (i) a deployed use configuration in which the portable outdoor cooker is capable of at least cooking food and (ii) a collapsed non-use configuration in which the portable outdoor cooker is capable of at least being transported and/or stored.

5. The portable outdoor cooker according to claim 4, wherein the top hood of the cooking chamber is pivotally coupled to the cooking chamber so as to be capable of pivoting between the open position and the closed position.

6. The portable outdoor cooker according to claim 4, wherein the cooking chamber further includes:
a first deflector plate support rail disposed within the interior space of the cooking chamber,
a second deflector plate support rail disposed within the interior space of the cooking chamber, the second deflector plate support rail being spaced apart from the first deflector plate support rail, the second deflector plate support rail forming at least part of a drip-collecting channel disposed within the interior space of the cooking chamber, the drip-collecting channel being disposed proximate to a drip outlet formed in the cooking chamber, a grate support rail disposed within the interior space of the cooking chamber, the grate support rail being disposed above the second deflector plate support rail, at least one deflector plate configured to be supported on the first deflector plate support rail and the second deflector plate support rail such that the at least one deflector plate slopes generally downwardly towards the second deflector plate support rail and the drip-collecting channel, and at least one grate configured to be supported on the at least one deflector plate and the grate support rail, the at least one grate being capable of supporting food thereon for being cooked when the portable outdoor cooker is in the deployed use configuration.

7. The portable outdoor cooker according to claim 4, wherein the cooking chamber further includes a plurality of carrying handles operably coupled thereto;

the portable outdoor cooker further comprising:
a shelf configured to be removably coupled to at least a carrying handle from the plurality of carrying handles operably coupled to the cooking chamber, wherein the shelf is shaped and sized such that, when the portable outdoor cooker is in the collapsed non-use configuration and the shelf is decoupled from the carrying handle, the entire shelf is capable of being stowed within the interior space of the cooking chamber beneath the top hood of the cooking chamber when the top hood is in the closed position.

8. The portable outdoor cooker according to claim 4, wherein the at least one side wall, the bottom wall and the top hood of the cooking chamber are rigid, wherein at least the main body of the burn chamber is rigid, and wherein the riser is rigid.

9. The portable outdoor cooker according to claim 4, wherein each of the plurality of support legs of the burn chamber are pivotally coupled to the main body of the burn chamber so as to be capable of pivoting between the supporting position and the non-supporting position.

10. The portable outdoor cooker according to claim 4, wherein at least a portion of the main body of the burn chamber is substantially elongated and tubular, and wherein the riser is substantially elongated and tubular.

11. The portable outdoor cooker according to claim 4, wherein at least one of the first and second end portions of the main body of the burn chamber has an access opening formed therein, wherein the access opening permits access into the interior space of the main body to permit at least solid combustible fuel to be loaded into the interior space of the main body and/or to permit at least cleaning out the interior space of the main body.

12. The portable outdoor cooker according to claim 11, wherein the burn chamber further includes a damper plate configured to be movably coupled to the main body of the burn chamber such that the damper plate is disposed adjacent to the access opening, the damper plate being further configured to be selectively moved between a plurality of positions with respect to the access opening to adjust an amount of air flow to be let into the interior space of the main body from outside of the main body.

13. The portable outdoor cooker according to claim 4, wherein the main body of the burn chamber further has a substantially elongated portion extending between the first and second end portions of the main body, and wherein when the portable outdoor cooker is in the deployed use configuration:

(i) each of the plurality of support legs of the burn chamber are in the supporting position, (ii) the substantially elongated portion of the main body of the burn chamber is capable of extending in a substantially horizontal direction with respect to at least the ground surface disposed below the main body, (iii) the riser is removably coupled to each of the cooking chamber and the burn chamber such that (a) the upper end portion of the riser is removably coupled to the cooking chamber at the opening formed in the bottom wall of the cooking chamber, (b) the lower end portion of the riser is removably coupled to the burn chamber at the opening formed in the upper portion of the main body of the burn chamber and (c) the riser extends in a substantially vertical direction with respect to at least the substantially elongated portion of the main body of the burn chamber, (iv) the riser is load-bearing such that the riser supports the weight of at least the cooking chamber, (v) the main body of the burn chamber is load-bearing such that the main body supports the combined weight of at least the cooking chamber and the riser, and (vi) each of the plurality of support legs of the burn chamber are load-bearing such that the plurality of support legs together support the combined weight of at least the cooking chamber, the riser and the main body of the burn chamber.

14. The portable outdoor cooker according to claim 4, wherein the burn chamber and the riser are each shaped and sized such that, when the portable outdoor cooker is in the collapsed non-use configuration and the riser is decoupled from the cooking chamber and the burn chamber, and each of the plurality of support legs of the burn chamber are in the non-supporting position, the entire burn chamber and the entire riser are capable of being stowed together within the interior space of the cooking chamber beneath the top hood of the cooking chamber when the top hood is in the closed position.

15. The portable outdoor cooker according to claim 4, wherein the at least one side wall of the cooking chamber has an opening formed therein;

the portable outdoor cooker further comprising:
a chimney configured to be removably coupled to the cooking chamber at the opening formed in the at least one side wall of the cooking chamber, wherein the chimney is shaped and sized such that, when the portable outdoor cooker is in the collapsed non-use configuration and the chimney is decoupled from the cooking chamber, the entire chimney is capable of being stowed within the interior space of the cooking chamber beneath the top hood of the cooking chamber when the top hood is in the closed position.

16. The portable outdoor cooker according to claim 4, wherein when the portable outdoor cooker is in the deployed use configuration:

(i) each of the plurality of support legs of the burn chamber are in the supporting position, (ii) the riser is removably coupled to each of the cooking chamber and the burn chamber such that (a) the upper end portion of the riser is removably coupled to the cooking chamber at the opening formed in the bottom wall of the cooking chamber and (b) the lower end portion of the riser is removably coupled to the burn chamber at the opening formed in the upper portion of the main body of the burn chamber,
(iii) the burn chamber is capable of receiving and housing solid combustible fuel within the interior space of the burn chamber such that, when solid combustible fuel is placed within the interior space of the burn chamber, the solid combustible fuel is capable of being burned within the interior space of the burn chamber to provide heat to the cooking chamber by way of the riser, and
(iv) the cooking chamber is capable of receiving and housing food within the interior space of the cooking chamber such that, when food is placed within the interior space of the cooking chamber, the food is capable of being cooked within the interior space of the cooking chamber; and
wherein when the portable outdoor cooker is in the collapsed non-use configuration:
(i) the riser is decoupled from each of the cooking chamber and the burn chamber such that (a) the upper end portion of the riser is decoupled from the cooking chamber and (b) the lower end portion of the riser is decoupled from the burn chamber,
(ii) each of the plurality of support legs of the burn chamber are in the non-supporting position, and
(iii) the cooking chamber is capable of receiving and housing the entire burn chamber and the entire riser within the interior space of the cooking chamber such that, when the entire burn chamber and the entire riser are each placed within the interior space of the cooking chamber and the top hood of the cooking chamber is in the closed position, the entire burn chamber and the entire riser are capable of being stowed together within the interior space of the cooking chamber beneath the top hood.

17. The portable outdoor cooker according to claim 4, wherein the at least one side wall of the cooking chamber has an opening formed therein;
the portable outdoor cooker further comprising:
a chimney configured to be removably coupled to the cooking chamber at the opening formed in the at least one side wall of the cooking chamber;
wherein when the portable outdoor cooker is in the deployed use configuration:
(i) each of the plurality of support legs of the burn chamber are in the supporting position,
(ii) the riser is removably coupled to each of the cooking chamber and the burn chamber such that (a) the upper end portion of the riser is removably coupled to the cooking chamber at the opening formed in the bottom wall of the cooking chamber and (b) the lower end portion of the riser is removably coupled to the burn chamber at the opening formed in the upper portion of the main body of the burn chamber,
(iii) the burn chamber is capable of receiving and housing solid combustible fuel within the interior space of the burn chamber such that, when solid combustible fuel is placed within the interior space of the burn chamber, the solid combustible fuel is capable of being burned within the interior space of the burn chamber to provide heat to the cooking chamber by way of the riser,
(iv) the chimney is removably coupled to the cooking chamber at the opening formed in the at least one side wall of the cooking chamber, and
(v) the cooking chamber is capable of receiving and housing food within the interior space of the cooking chamber such that, when food is placed within the interior space of the cooking chamber, the food is capable of being cooked within the interior space of the cooking chamber; and
wherein when the portable outdoor cooker is in the collapsed non-use configuration:
(i) the riser is decoupled from each of the cooking chamber and the burn chamber such that (a) the upper end portion of the riser is decoupled from the cooking chamber and (b) the lower end portion of the riser is decoupled from the burn chamber,
(ii) each of the plurality of support legs of the burn chamber are in the non-supporting position,
(iii) the chimney is decoupled from the cooking chamber, and
(iv) the cooking chamber is capable of receiving and housing the entire burn chamber, the entire riser and the entire chimney within the interior space of the cooking chamber such that, when the entire burn chamber, the entire riser and the entire chimney are each placed within the interior space of the cooking chamber and the top hood of the cooking chamber is in the closed position, the entire burn chamber, the entire riser and the entire chimney are capable of being stowed together within the interior space of the cooking chamber beneath the top hood.

18. The portable outdoor cooker according to claim 4, wherein the at least one side wall of the cooking chamber has an opening formed therein;
the portable outdoor cooker further comprising:
a chimney configured to be removably coupled to the cooking chamber at the opening formed in the at least one side wall of the cooking chamber; and
a shelf configured to be removably coupled to the cooking chamber;
wherein when the portable outdoor cooker is in the deployed use configuration:
(i) each of the plurality of support legs of the burn chamber are in the supporting position,
(ii) the riser is removably coupled to each of the cooking chamber and the burn chamber such that (a) the upper end portion of the riser is removably coupled to the cooking chamber at the opening formed in the bottom wall of the cooking chamber and (b) the lower end portion of the riser is removably coupled to the burn chamber at the opening formed in the upper portion of the main body of the burn chamber,
(iii) the burn chamber is capable of receiving and housing solid combustible fuel within the interior space of the burn chamber such that, when solid combustible fuel is placed within the interior space of the burn chamber, the solid combustible fuel is capable of being burned within the interior space of the burn chamber to provide heat to the cooking chamber by way of the riser,
(iv) the chimney is removably coupled to the cooking chamber at the opening formed in the at least one side wall of the cooking chamber,
(v) the shelf is removably coupled to the cooking chamber, and
(vi) the cooking chamber is capable of receiving and housing food within the interior space of the cooking chamber such that, when food is placed within the interior space of the cooking chamber, the food is capable of being cooked within the interior space of the cooking chamber; and wherein when the portable outdoor cooker is in the collapsed non-use configuration:
(i) the riser is decoupled from each of the cooking chamber and the burn chamber such that (a) the upper end portion of the riser is decoupled from the cooking chamber and (b) the lower end portion of the riser is decoupled from the burn chamber,
(ii) each of the plurality of support legs of the burn chamber are in the non-supporting position,
(iii) the chimney is decoupled from the cooking chamber,
(iv) the shelf is decoupled from the cooking chamber, and
(v) the cooking chamber is capable of receiving and housing the entire burn chamber, the entire riser, the entire chimney and the entire shelf within the interior space of the cooking chamber such that, when the entire burn chamber, the entire riser, the entire chimney and the entire shelf are each placed within the interior space of the cooking chamber and the top hood of the cooking chamber is in the closed position, the entire burn chamber, the entire riser, the entire chimney and the entire shelf are capable of being stowed together within the interior space of the cooking chamber beneath the top hood.

19. The portable outdoor cooker according to claim 4, wherein the at least one side wall of the cooking chamber has an opening formed therein;
the portable outdoor cooker further comprising:
a chimney configured to be removably coupled to the cooking chamber at the opening formed in the at least one side wall of the cooking chamber;
a shelf configured to be removably coupled to the cooking chamber; and
a drip receptacle configured to be removably coupled to the shelf;
wherein when the portable outdoor cooker is in the deployed use configuration:
(i) each of the plurality of support legs of the burn chamber are in the supporting position,
(ii) the riser is removably coupled to each of the cooking chamber and the burn chamber such that (a) the upper end portion of the riser is removably coupled to the cooking chamber at the opening formed in the bottom wall of the cooking chamber and (b) the lower end portion of the riser is removably coupled to the burn chamber at the opening formed in the upper portion of the main body of the burn chamber,
(iii) the burn chamber is capable of receiving and housing solid combustible fuel within the interior space of the burn chamber such that, when solid combustible fuel is placed within the interior space of the burn chamber, the solid combustible fuel is capable of being burned within the interior space of the burn chamber to provide heat to the cooking chamber by way of the riser,
(iv) the chimney is removably coupled to the cooking chamber at the opening formed in the at least one side wall of the cooking chamber,
(v) the shelf is removably coupled to the cooking chamber,
(vi) the drip receptacle is removably coupled to the shelf, and
(vii) the cooking chamber is capable of receiving and housing food within the interior space of the cooking chamber such that, when food is placed within the interior space of the cooking chamber, the food is capable of being cooked within the interior space of the cooking chamber; and
wherein when the portable outdoor cooker is in the collapsed non-use configuration:
(i) the riser is decoupled from each of the cooking chamber and the burn chamber such that (a) the upper end portion of the riser is decoupled from the cooking chamber and (b) the lower end portion of the riser is decoupled from the burn chamber,
(ii) each of the plurality of support legs of the burn chamber are in the non-supporting position,
(iii) the chimney is decoupled from the cooking chamber,
(iv) the shelf is decoupled from the cooking chamber,
(v) the drip receptacle is decoupled from the shelf, and
(vi) the cooking chamber is capable of receiving and housing the entire burn chamber, the entire riser, the entire chimney, the entire shelf and the entire drip receptacle within the interior space of the cooking chamber such that, when the entire burn chamber, the entire riser, the entire chimney, the entire shelf and the entire drip receptacle are each placed within the interior space of the cooking chamber and the top hood of the cooking chamber is in the closed position, the entire burn chamber, the entire riser, the entire chimney, the entire shelf and the entire drip receptacle are capable of being stowed together within the interior space of the cooking chamber beneath the top hood.

20. A portable outdoor cooker comprising:
a cooking chamber including one or more side walls, a bottom wall and a top hood configured to be movable with respect to the one or more side walls and the bottom wall, the top hood being further configured to be selectively moved between an open position and a closed position;
a burn chamber having an upper portion and a lower portion, the lower portion having a lowermost surface of the burn chamber, the burn chamber further including a plurality of support legs configured to be selectively moved between (i) a supporting position in which the plurality of support legs are together capable of supporting the burn chamber in an elevated position in which at least the lowermost surface of the burn chamber is capable of being spaced above a ground surface disposed below the burn chamber and (ii) a non-supporting position in which the plurality of support legs are not capable of supporting the burn chamber in the elevated position; and
a riser configured to removably operably couple the cooking chamber and the burn chamber to each other;
wherein the portable outdoor cooker is configured to be selectively transitioned between (i) a deployed use configuration in which the portable outdoor cooker is capable of at least cooking food and (ii) a collapsed non-use configuration in which the portable outdoor cooker is capable of at least being transported and/or stored;
wherein when the portable outdoor cooker is in the deployed use configuration:
(i) each of the plurality of support legs of the burn chamber are in the supporting position,
(ii) the riser removably operably couples the cooking chamber and the burn chamber to each other,
(iii) the burn chamber is capable of receiving and housing solid combustible fuel therein such that, when solid combustible fuel is placed within the burn chamber, the solid combustible fuel is capable of being burned within the burn chamber to provide heat upwardly through the riser and to the cooking chamber, and (iv) the cooking chamber is capable of receiving and housing food therein such that, when food is placed within the cooking chamber, the food is capable of being cooked within the cooking chamber; and wherein when the portable outdoor cooker is in the collapsed non-use configuration:

(i) the riser does not removably operably couple the cooking chamber and the burn chamber to each other, (ii) each of the plurality of support legs of the burn chamber are in the non-supporting position, and (iii) the cooking chamber is capable of receiving and housing the entire burn chamber and the entire riser therein such that, when the entire burn chamber and the entire riser are placed within the cooking chamber and the top hood of the cooking chamber is in the closed position, the entire burn chamber and the entire riser are capable of being stowed within the cooking chamber beneath the top hood.

* * * * *